US012462615B2

(12) United States Patent
Merchant et al.

(10) Patent No.: US 12,462,615 B2
(45) Date of Patent: Nov. 4, 2025

(54) SYSTEM AND METHOD FOR COMPUTER VISION ASSISTED PARKING SPACE MONITORING WITH AUTOMATIC FEE PAYMENTS

(71) Applicant: Automotus Inc., Los Angeles, CA (US)

(72) Inventors: Anil Merchant, Dublin, CA (US); Harris Graves Lummis, Houston, TX (US); Ganesh Sankar Harsha Vardhan Vanama, Eastvale, CA (US); Sai Prajwal Kotamraju, Los Angeles, CA (US); Raghak Radhakrishnan, Los Angeles, CA (US); Ashwin Mohan, Pasadena, CA (US); Michelle L'Estrange, Danville, CA (US)

( * ) Notice: Subject to any disclaimer, the term of this patent is extended or adjusted under 35 U.S.C. 154(b) by 0 days.

(21) Appl. No.: 18/665,031

(22) Filed: May 15, 2024

(65) Prior Publication Data
US 2024/0296700 A1    Sep. 5, 2024

Related U.S. Application Data

(63) Continuation-in-part of application No. 17/962,169, filed on Oct. 7, 2022, now abandoned.

(51) Int. Cl.
*G07B 15/02*    (2011.01)
*G06Q 30/0283*    (2023.01)
(Continued)

(52) U.S. Cl.
CPC ......... *G07B 15/02* (2013.01); *G06Q 30/0284* (2013.01); *G06Q 30/04* (2013.01);
(Continued)

(58) Field of Classification Search
CPC .................................................. G07B 15/02
See application file for complete search history.

(56) References Cited

U.S. PATENT DOCUMENTS

| 2013/0266190 A1* | 10/2013 | Wang | G06V 20/63 |
| | | | 382/105 |
| 2014/0039987 A1* | 2/2014 | Nerayoff | H04N 7/181 |
| | | | 348/148 |

(Continued)

FOREIGN PATENT DOCUMENTS

CN        105225522 A    *    1/2016

OTHER PUBLICATIONS

Bijo, Thomas; "Development of a cost effective bird's eye view parking assistance system"; Nov. 3, 2011; https://ieeexplore.ieee.org/stamp/stamp.jsp?tp=&arnumber=6069355 (Year: 2011).*

(Continued)

*Primary Examiner* — Shannon S Campbell
*Assistant Examiner* — David G. Godbold
(74) *Attorney, Agent, or Firm* — Nathanial P. Potter

(57) ABSTRACT

A system and method for computer vision assisted parking space monitoring, vehicle identification, transactionable event determination, calculation of parking fees, automated transaction processing, invoice generation, user communication, and automated payment processing from a registered user via a registered user account with prior user authorization and providing traffic and parking data to interested users and third parties.

20 Claims, 8 Drawing Sheets

(51) Int. Cl.
    *G06Q 30/04*     (2012.01)
    *G06T 7/20*     (2017.01)
    *G06T 7/70*     (2017.01)
    *G06V 10/26*     (2022.01)
    *G06V 20/52*     (2022.01)

(52) U.S. Cl.
    CPC .................. *G06T 7/20* (2013.01); *G06T 7/70* (2017.01); *G06V 10/26* (2022.01); *G06V 20/52* (2022.01); *G06T 2207/30232* (2013.01); *G06T 2207/30252* (2013.01); *G06V 2201/08* (2022.01)

(56) References Cited

U.S. PATENT DOCUMENTS

| | | | | |
|---|---|---|---|---|
| 2020/0294105 | A1* | 9/2020 | Jiang | G06Q 20/127 |
| 2021/0232824 | A1* | 7/2021 | Shayne | G06V 20/40 |
| 2022/0335722 | A1* | 10/2022 | Xue | G06V 10/82 |
| 2024/0067034 | A1* | 2/2024 | Newkirk | B60L 53/665 |
| 2024/0087457 | A1* | 3/2024 | Jeong | G06V 20/62 |

OTHER PUBLICATIONS

Hu; "Relation Networks for Object Detection"; Nov. 30, 2017; https://arxiv.org/pdf/1711.11575 (Year: 2017).*

\* cited by examiner

SYSTEM AND METHOD FOR COMPUTER VISION ASSISTED PARKING SPACE MONITORING WITH AUTOMATIC FEE PAYMENTS

CROSS-REFERFENCE TO RELATED APPLICATIONS

The present application is a continuation-in-part application of the co-pending application and claims the benefit of:

U.S. Nonprovisional application Ser. No. 17/962,169, titled "A SYSTEM AND METHOD FOR COMPTUER VISION ASSISTED PARKING SPACE MONITORING WITH AUTOMATIC FEE PAYMENTS," with Anil Merchant as the first named inventor, on Oct. 7, 2022.

This application incorporates the entire contents of the prior application herein by reference.

FIELD OF INVENTION

The present invention generally relates to a system and method for monitoring, regulating, and automating payments for curbside parking as well as providing parking and traffic data to drivers and third parties. More particularly, the present invention combines computer vision technology with vehicle identification, tagging, and tracking software with systems having user databases and automated payment options to provide contactless and effortless invoicing and payment for an individual's use of a monitored parking space in addition to a plurality of additional features.

BACKGROUND OF THE INVENTION

Parking lots and curbside parking meters are commonly used to supply drivers with places for those drivers to leave their vehicles. Both private and public controllers often supply these parking services for the benefit of drivers and usually choose to monetize for the time a vehicle is parked in any particular parking lot or curbside parking space. This monetization may be collected by individuals, meters, or automated systems. Further, compliance with parking laws, regulations, and guidelines may be enforced either autonomously or by individual parking service employees.

More recent developments have seen the rise of contactless monetization and payment for drivers to use parking lots and curbside parking spaces. This contactless monetization includes methods such as prepaying and providing vehicle information, ticket with kiosk payment systems, parking meters including payment mechanisms such as coin and credit card receivers, and mobile applications allowing for parking spot designation and payment for desired length of time. These systems may cause drivers various issues with payment, time allotted, time spent interacting with the system, and mobile device issue concerns among other issues. Likewise, private and public controllers of these parking services may have less than ideal solutions with monitoring and enforcing payment for their services as well as transactional issues with the monitoring and payment systems.

Time and convenience continue to grow as some of the most important factors for users to adopt new technologies. As such, the ability for a driver to park their car, get out of it, and go about their day has become an idealized version of inner-city parking. Further, the lack of need to fiddle with an application, kiosk, or parking meter has also grown to be a consumer desire. Therefore, there is a need for an automated parking fee calculation and processing system which allows drivers to perform a short initial setup once before their future and subsequent parking matters become automated, saving them valuable time and attention to more important parts of their day. Further, this innovation would remove a good bit of anxiety about paying for parking, worrying about how much time is left on a parking session, and other parking concerns.

Moreover, camera-based parking space monitoring has brought about the capability for and subsequent need for data collection and presentation to private users, commercial users, fleets, cities, and other entities with needs for reviewing that data. This data can be used for planning purposes from an individual to a city-level including assessing fees to charge for parking, limiting parking durations, determining hours of enforcement of parking rules, etc. Therefore, additional tools are required to provide traffic and parking data to those interested parties. Further, software applications that can provide said data to those parties may also be effective in providing other services such as parking space reservation, availability correspondence, and more in an effective and commercially usable manner.

SUMMARY OF THE INVENTION

The following presents a simplified summary of the present invention to provide a basic understanding of the invention's concepts. This summary is not an extensive overview, and it is not intended to identify critical elements or to limit the scope of this disclosure. The sole purpose of this summary is to present some general concepts in a simplified form as a prelude to the detailed description of the invention.

The subject matter disclosed and claimed herein, in some embodiments of the present invention, relates to a system for automated fee charging and automated payment for parking comprising: a parking and traffic monitoring device having: one or more processors, a computer vision pipeline and an image uploader, wherein the computer vision pipeline includes two sensors operably coupled to a single processing unit, a communication unit capable of communicating via a network; wherein the computer vision pipeline generates at least one event message and at least one image per sensor, wherein each image contains at least one object subject to at least one event, wherein a unique identifier is generated and assigned linking the at least one event message to each image containing the at least one object, wherein the computer vision pipeline is operably connected to an event ingestion service via the network to receive the at least one event message, and wherein the image uploader is operably connected to an image store via the network to receive the at least one image per sensor; an image indexing service which receives at least one image from the image store and sorts the at least one image based on at least one sort criteria; a data store which receives the at least one event message via the event ingestion service and the at least one image per sensor via the image store, relates them via the assigned unique identifier, and stores them; a transaction creation service that assesses whether a transactionable event occurred using a policy API to determine a fee for a user based on the at least one event message; an application including a user API that allows the user to operably connect to the system via the network; wherein a driver who is the user may, prior to the at least one event, register an account including information related to the driver and provide to the system (1) information related to at least one payment method, (2) features of the driver's vehicle, and (3) preauthorization for payment for at least one fee associated with the user parking the driver's vehicle in a parking space monitored by the parking and traffic monitoring device, wherein the driver's vehicle is the object associated with unique identifier subject to the fee for the invoice; and wherein the system automatically charges the user's payment method for the user's parking session without interaction by the user due to the information provided in the registered user account, active payment method, and pre-authorization for payment for the user's parking subject to fees generated by the system.

The subject matter disclosed and claimed herein, in some embodiments of the present invention, relates to A method for automated fee charging and automated payment for parking comprising: a user registering a user account with a system for automated fee charging and automated payment for parking, through a user API, wherein the user provides the user's personally identifiable information, information about the user's vehicle, at least one payment method, and the user agrees to a pre-authorization to be automatically charged for the presence of the user's vehicle in a monitored parking space; using a single parking and traffic monitoring device to monitor at least one parking space, wherein the parking and traffic monitoring device uses a computer vision pipeline to: simultaneously record at least one image from each of two sensors, the two sensors being operably coupled, via a multiplexing program, into a single processing unit; use an object inference program to determine a primary inference by detecting and identifying at least one object in the images; use a duplicate detection elimination program to perform a cross-class multi-suppression to eliminate and suppress duplicate object detections within the images; use a tracking program to track the at least one object detected and identified by the object inference program through a plurality of images; perform a secondary inference to detect, determine, and assign at least one feature for each at least one object within the images; improve object tracking accuracy by using a tracker correction program to monitor the history of the at least one object's position in each image, assign a unique identifier to each detected and tracked object within each image, apply perspective transformations on coordinates corresponding to each detected and tracked object's bounding box, use the highest intersection over union values to identify the same object in images taken from the two sensors, perform occlusion analysis and prediction to determine the position of an occluded object, and record the generated data for each image; generate, via an events generation program, at least one event related to the recorded at least one image from each of two sensors by analyzing the at least one object's history within a sequence of images, particularly, that object's history within a region of interest within the sequence of images; in tandem, publish the event messages to a service via a message broker, and save the at least one image from each sensor to storage; sending, via a network, the event messages to an event ingest service prior to the event messages reaching a data store within the system; uploading, via the network, the images recorded by the computer vision pipeline to an image store before those images are ran through an image indexing service, which sorts the images based on at least one sort criteria, prior to the images being stored on the data store; the data store, pairing the stored images with their corresponding event messages; the data store, employing a transaction creation service to assess whether a transactionable event occurred; the system automatically charging the user a fee corresponding to an amount owed for the transactionable event; and the user automatically paying the charged fee, with no interaction from the user, due to the user's provided information in the user's registered account information, including the pre-authorization to be automatically charged, with the system.

To the accomplishment of the foregoing and related ends, certain illustrative aspects of the disclosed innovation are described herein in connection with the following description and the annexed drawings. These aspects are indicative of only a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The embodiments of the present invention disclosed herein are illustrated by way of example, and not by way of limitation, in the figures of the accompanying drawings, in which like reference numerals may refer to similar elements.

DETAILED DESCRIPTION OF THE PRESENT INVENTION

Figure 1:
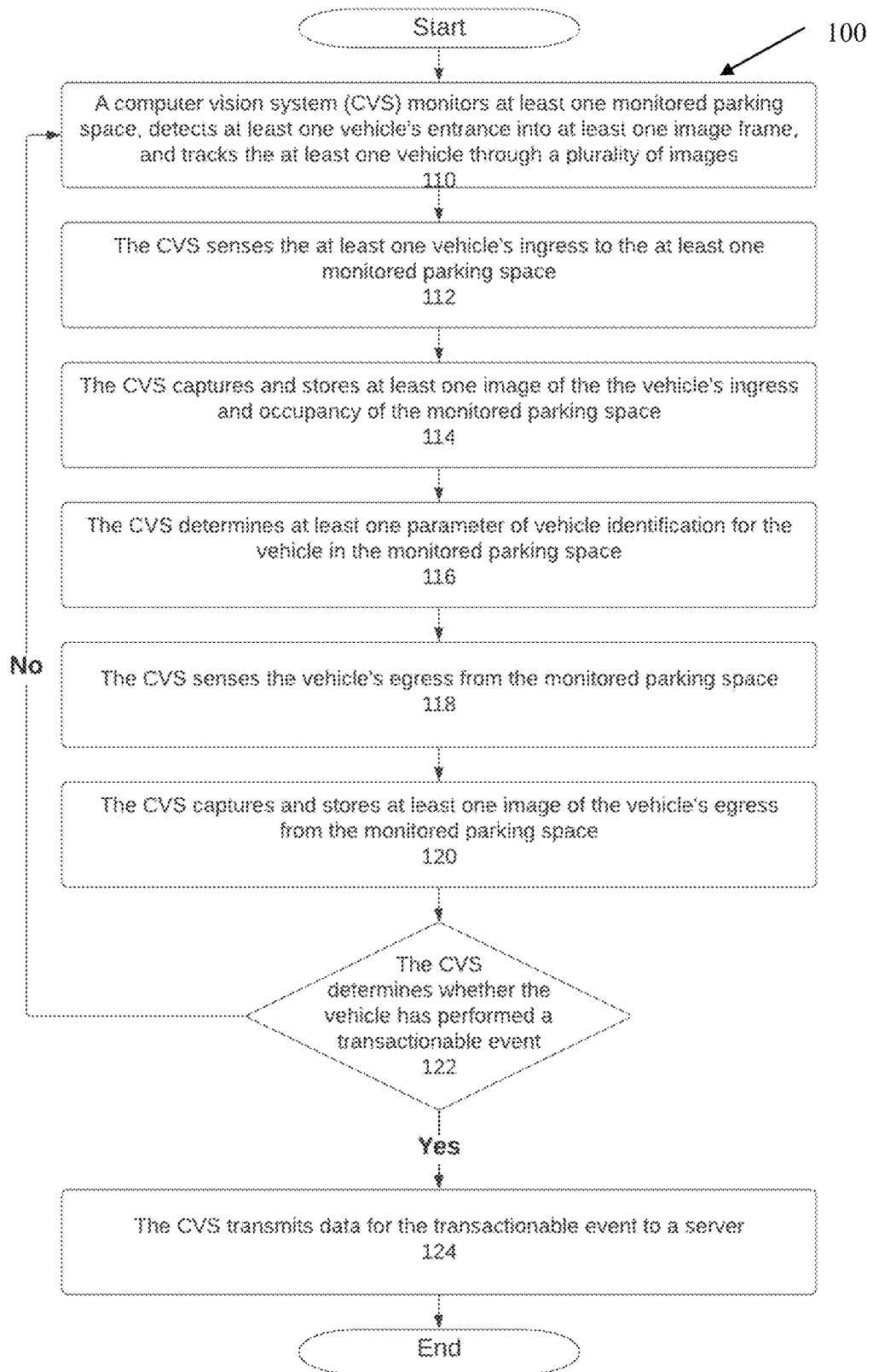
FIG. 1 is an exemplary embodiment of a computer vision system tasked with monitoring at least one monitored parking space.

The innovation is now described with reference to the drawings, wherein reference numerals are used to refer to elements throughout. In the following description, for purposes of explanation, numerous specific details are set forth to provide a thorough understanding of the present invention. It may be evident that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As mentioned, despite there being many metered parking solutions such as parking lot attendants, kiosks, parking meters, identification and/or tag systems, and several application or web-based solutions, there still exists a need for a parking solution that includes automated billing and fee adjustment based on smaller windows of time. Therefore, a computer vision assisted parking system that charges users for parking for smaller increments of time (such as every one minute or five minutes) is ideal for users and for operators of the parking systems. This smaller increment and monitoring of parking spaces via the computer vision system cuts down on costs associated with labor related to parking enforcement. It is not cost-effective to monitor and enforce parking regulations for small increments of time or short parking durations (such as less than 20 minutes) via traditional means such as meters and parking enforcement officials, hence the need for an automated system. Further, it is convenient for users because a user with a registered user account may simply park in a space, exit their vehicle, continue to their destination, return to their vehicle, enter the vehicle and drive away from the parking space without any time spent paying parking fees. Even further conveniences are that the user is charged in a narrower window of time and does not have to guess the duration of their parking needs beforehand, as is the case for prepaid meters and similar means.

FIG. 1 is an exemplary embodiment of a method for a computer vision system tasked with monitoring at least one monitored parking space. In some embodiments of a method for monitoring a monitored parking space and transmitting transactionable events to a server 100, a computer vision system (CVS) monitors at least one monitored parking space, detects at least one vehicle's appearance into at least one image frame, and tracks the at least one vehicle through a plurality of images 110. In some embodiments, the CVS includes a computer vision pipeline having at least one capture device (such as camera hardware), at least one computer including at least one processor, computer readable memory, a network connection to a server, and other necessary components typically found in computer devices, and specialized algorithms, programs, software, APIs, and/or instructions to detect, monitor, track, evaluate, identify, calculate, and determine the occurrence of events in the system. Events include the at least one vehicle's first appearance in the at least one image frame, identifying the vehicle, detecting the vehicle's ingress, presence, and egress from the monitored parking space (aka "tracking" the vehicle), determining whether a transactionable event occurred, and more. In further embodiments, the CVS includes specially trained algorithms, APIs, programs, software, and/or sets of routines and/or instructions that focus on sensing a vehicle's ingress, presence, and egress from a monitored parking space (including algorithms, software, or programs that account for obfuscation or occlusion of the vehicle during any part of the foregoing), collecting at least one type of identifying information for a vehicle, and determining if a transactionable event has occurred. Image frames are the boundaries of at least one image and may be a single image frame generated by one capturing device or a more comprehensive, collection of image frames that may be generated by multiple capturing devices recording images from multiple angles of the monitored parking space.

In some embodiments, the CVS may track and/or capture at least one image for the at least one vehicle throughout the entirety of the vehicle's presence in the plurality of images. Further, a feature vector describing the subject vehicle is extracted from successive images captured by the CVS, and used to maintain a consistent identifier for the particular subject vehicle across these successive images. This enables the CVS to track the vehicle and determine the duration of the vehicle's stay in the at least one monitored parking space. In some embodiments, the CVS may include tracking software that accounts for obstructions that prevent capturing of any at least one vehicle's presence in any of the plurality of images.

It should be appreciated by those skilled in the art that "monitored parking space" is an inclusive term that generally means a defined area where a vehicle could be parked. The reasons for parking the vehicle in the defined area could be non-commercial or commercial (such as a curbside loading zone). In some embodiments, the monitored parking space or monitored parking spaces may have distinct markings of the dimensions of each parking space or they may be a larger, less obviously marked areas suited for larger vehicles (such as a semi-trailer truck) or multiple consumer vehicles. Further, and for an abundance of clarity, "monitored parking space" could include any number of curbside spaces that are not distinctly marked but are monitored as a block, line, or other suitable formation of parking spaces.

In some embodiments, the CVS senses the at least one vehicle's ingress to the at least one monitored parking space 112. The CVS may include algorithms or specialized programs that are trained to determine whether a vehicle has sufficiently ingressed into any monitored parking space. This training may include adaptable conditions to raise the CVS's tolerance of false positive ingresses into any monitored parking space (such as when a vehicle rolls through one space and into another or if a vehicle egresses from the monitored parking space almost immediately).

In some embodiments, the CVS captures and stores at least one image of the ingressing vehicle and the vehicle's occupancy in the monitored parking space 114. In some embodiments, at least one image is captured of the ingressing vehicle. This image ideally displays the vehicle's ingress as well as at least one parameter of vehicle identification. Further, the CVS may include a beginning timestamp identifying the ingress and start of the at least one vehicle's occupancy of the at least one monitored parking space. The CVS may capture the vehicle's identifying information from one or more areas within the CVS's field of view which may be considered to yield better clarity images of that vehicle's identifying information (such as its license plate) instead of while/after the vehicle has parked.

In some embodiments, the sensing, capturing, and storing of any data occurs in real time at set intervals. These set intervals may be from a range from fractions of a second to minutes apart. Further, the CVS may monitor and sense continuously but only capture and store images when the vehicle first enters the image frame, and the vehicle's ingress, occupancy, or egress from the monitored parking space is detected. Even further, some CVSs may also capture and store images at set intervals such as every 60 seconds to generate a record of any number of vehicles' ingress, presences, and egress from any number of monitored parking spaces. Additionally, in some embodiments of the present invention, the images may further display vehicle identification information.

In some embodiments, the CVS determines at least one parameter of vehicle identification for the vehicle occupying the monitored parking space 116. The at least one parameter of vehicle identification may be recognition of the vehicle's make, vehicle's model, license plate, license plate state, license plate number, vehicle's color, other identifying details of the vehicle, an identifying tag, an identifying sticker, a transmitter, etc. Identification may occur via edge computing, edge processing, or "on the edge" (that is to say, by local devices), by the computing hardware of the nearest CVS, by a server within the greater system that promotes the method of the present invention, by a third party application or system, or by another similar means. The determination of at least one parameter of vehicle identification may occur at different points throughout the method such as when the vehicle first enters the image frame, when the vehicle is first detected within any image (in case there was possible delay in detection due to one or more obstructions), when the vehicle ingresses into a monitored parking space, or some other suitable point for the purposes of tracking the vehicle.

In some embodiments, the CVS senses the at least one vehicle's egress from the at least one monitored parking space 118. The sensing of the vehicle's egress is also due to trained algorithms, software, or sets of computer instructions. Also, like the vehicle's ingress, these algorithms, software, or programs may include conditions and sets of criteria to prevent false positives, triggers, or reporting.

In some embodiments, the CVS captures and stores at least one image of the vehicle's egress from the vehicle's previously occupied parking space 120. Unlike the vehicle's ingress and presence within the monitored parking space, the vehicle's egress naturally means that the vehicle will likely be exiting the CVS's range of operation and vision. Therefore, the CVS may include trained algorithms, software, APIs, or instructions to begin capturing images at short set intervals when a vehicle's egress is detected and while the vehicle is still within the CVS's field of view. This increases the likelihood that the vehicle's at least one parameter of vehicle identification is captured during the vehicle's egress. Further, the CVS may include an ending timestamp identifying the end of the at least one vehicle's occupancy of the at least one monitored parking space.

In some embodiments, the CVS determines whether the vehicle has performed a transactionable event 122. A transactionable event may include the vehicle's ingress to the monitored parking space, the vehicle's egress from the monitored parking space, the amount of time the vehicle occupied the monitored parking space, or combinations of the preceding. In further embodiments, the CVS includes software policy instructions for the system that may limit what can be determined as a transactionable event. For example, the CVS's operator may desire transactionable events to only occur on certain days, during certain time periods, for certain vehicles, etc.

In some embodiments, when the CVS has determined that the transactionable event has occurred, the CVS then transmits the data related to the transactionable event to a server 124. Captured data may include images of the vehicle, images of the vehicle's ingress, presence, and egress from the monitored parking space, calculations for the duration of the vehicle's occupancy of the monitored parking space (such as the difference between ingress time and egress time), vehicle identification data (either retrieved on the edge device or from a server), policy data, CVS system data, and other data related to the operation of the CVS, method, and server.

In the depicted embodiment, the CVS determines whether a transactionable event has occurred prior to transmitting the data to the server; however, alternate embodiments may have the CVS transmit the data related to a potential transactionable event to the server which allows the software on the server to determine whether a transactionable event has occurred. Those skilled in the art will appreciate that these steps are interchangeable and primarily depend on the deployment of hardware and software solutions to facilitate the system and method of the present inventions. One view of the choice may be between having more investment in hardware and software for the computer vision system to lessen network traffic and the computing and storage power of the server. Alternatively, deployers of the system and method may want less hardware and software investment in the computer vision system which could be subject to weather issues, traffic accidents, or other sources of potential equipment damage and/or disruption.

Figure 2:
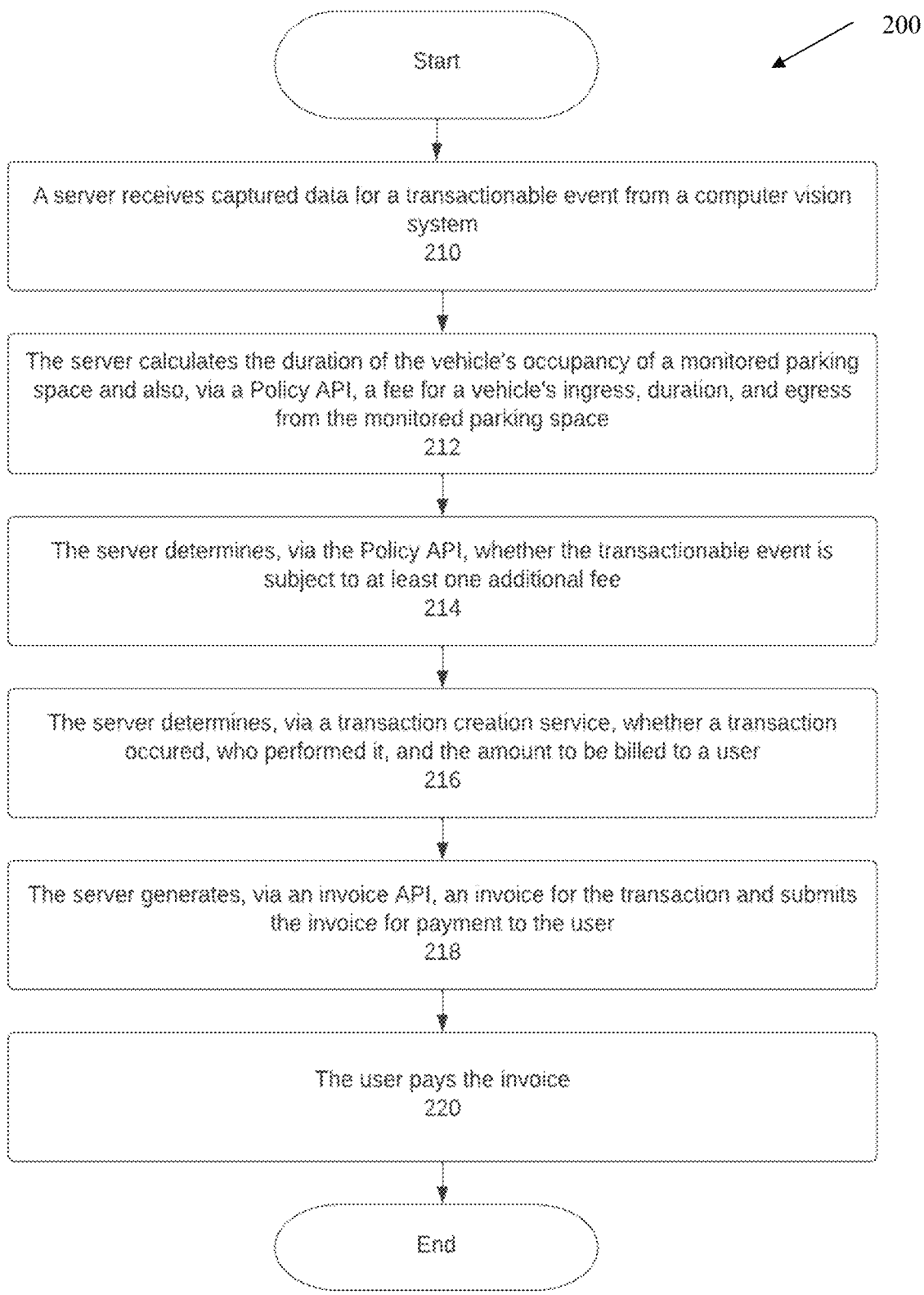
FIG. 2 is an exemplary embodiment of a method for a server invoicing a user for the user's parking fee.

FIG. 2 is an exemplary embodiment of a method for a server invoicing a user for the user's parking fee. In some embodiments, a method for a server to invoice a user 200 begins by the server receiving the captured data from the CVS regarding the transactionable event 210.

In some embodiments, the server calculates the duration of the vehicle's presence or occupancy of the monitored parking space and also, via a Policy API, a fee for the vehicle's ingress, duration, and egress from the monitored parking space 212. Most commonly, the duration of the vehicle's presence within the monitored parking space is the span of time between the vehicle's ingress and the vehicle's egress. Further, ingression and egression times may be rounded or truncated to the nearest minute for simplicity of calculation of the duration. Even further, some embodiments may include a grace period (such as any duration under 5 minutes) wherein the vehicle's owner is not invoiced and charged for the vehicle's use of the monitored parking space for the first five minutes that it is occupied.

In some embodiments, the Policy API provides computer-readable instructions for the server related to policy information for the at least one monitored parking space, determines whether a particular event (such as a session at the curb) qualifies as a transactionable event, calculates the fee for the vehicle's ingress, presence, and egress from the monitored parking space, determines whether at least one additional fee is required for the transactionable event, calculates a total fee, provides notices to the system owner or third parties, and more. Policy information may relate to hours of operation, rates for parking in the at least one monitored parking space, maximum allowed time of a stay, etc.

In some embodiments, the system determines, via the Policy API, whether the transactionable event is subject to at least one additional fee 214. Examples of the at least one additional fee include initial and/or flat fees for the vehicle's ingress into the monitored parking space, flat fees for overnight parking (particularly if the CVS does not operate between certain hours of the day such as from midnight to 6 AM), fees for the vehicle's presence in the monitored parking space beyond the allowable maximum stay (for example, if a particular monitored parking space only allowed the same vehicle to occupy it for 2 hours and a vehicle stayed beyond that time limit), and fees for oversized vehicles or vehicles not safely occupying the monitored parking space.

In some embodiments, the server verifies, via a transaction creation service, whether a transactionable event has occurred, who performed it, and the amount to be billed to the user 216. The transaction creation service communicates with the Policy API to determine whether the vehicle's ingress, presence, and egress from the at least one monitored parking space qualifies as the transactionable event. Further, the transaction creation service, potentially with the aid of other instructions, conditions, modules, APIs, etc., may perform an assessment to determine whether a transactionable event occurred in which the transaction creation service identifies the vehicle and confirms whether the vehicle is connected with a registered user account. The "invoice," or merely transaction, may be a transaction notice within the system, never reaching the user before payment is charged, that causes the processing of the user's pre-authorized deposit account or wallet, or, if those avenues are insufficient, payment method for the user's parking.

In some embodiments, the server generates, via an Invoice API, an invoice for the transactionable event and submits that invoice for payment by the user 218. The Invoice API performs a calculation based on the fee for the vehicle's presence in the monitored parking space (this is commonly a simple formula of "duration of stay" multiplied by "rate per hour") and any other additional fees (such as a flat fee to enter the space, a fee for staying beyond an allowed time limit, a flat rate administrative fee, and/or a penalty) to determine the total fee. The total fee may be the only charge present on the invoice or the charges may be broken down into the fee and any additional fees. This invoice may be submittable or sent to the user via connected information on a registered user account (such as a phone number or email address), to an email or phone number retrieved from a third party database containing user information tied to the vehicle, or via physical mail to an address retried from a third party database containing owner information for the vehicle. Even further, "invoice" as used within the method and system of the present invention may also mean the general concept of sending, requesting, charging, and/or automatically processing an amount owed for a transaction. Meaning the invoice is generated and used by the method and/or system to determine which register user to charge, but the relevant registered user does not need to receive, review, and manually pay the fee/invoice. Manual fee payment includes providing and/or inputting credit card, banking, or e-wallet details.

In alternative embodiments, the transactionable event may be charged to the user's account/payment method without the generation of a formal invoice. This is possible due to the pre-authorization by the user. In some instances, the invoice may be later generated and supplied to the user after a criteria is met such as a set number of transactions, a set total duration of parking time, a set number of parking instances, etc. Alternatively, invoices may only be generated for vehicles related to unregistered users who use the parking space(s).

In some embodiments, an invoice for the aggregate total fee may be generated from multiple occurrences of the user's at least one vehicle occupying one or more monitored parking spaces. These aggregate total fee invoices may be generated by the server or by a third party processor.

In some embodiments, the user pays the invoice 220. This payment transaction may be an automatic payment transaction that is processed by the system and based on the user's settings in the user's registered user account. The user's payment may be made by the user either actively through a payment gateway or passively (from the user's perspective) from a pre-arranged, automated payment method. One example of a user's active payment is the user, having parked in the monitored parking space and exited their vehicle, using their mobile device to log in to a website or application to assist the user with payment of the parking fee. This payment, in some embodiments, may be made before the user exits the monitored parking space in the user's vehicle (in which case the user likely must estimate their total stay time) or after the user has entered their vehicle and left the monitored parking space. If the user has left the parking space and does not pay for their total fee, the user may be subject to additional fees for late payment. Further, the CVS and system of the present invention may search for the user's information to send an invoice or provide the user and/or the user's vehicle information to third parties and/or parking authorities.

Figure 3:
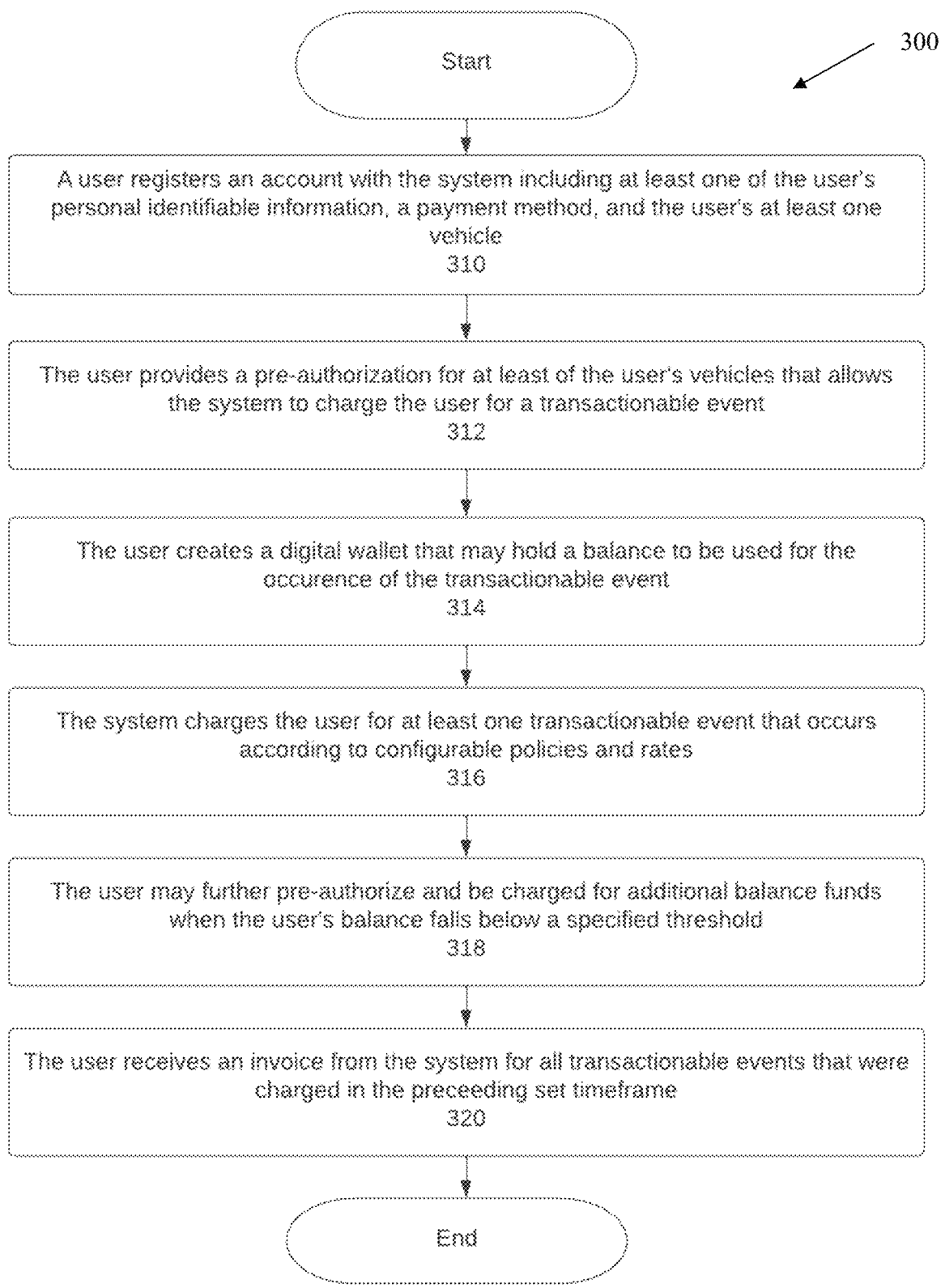
FIG. 3 is an exemplary embodiment of a method for a user registering an account for an autonomous parking fee system.

FIG. 3 is an exemplary embodiment of a method for a user registering an account for an autonomous parking fee system. In some embodiments, the user's account registration and automated invoice payment 300 begins when the user registers an account with the system including information such as at least one of the user's personal identifiable identification ("PII"), a payment method, and/or the user's at least one vehicle 310. PII includes identifying information such as the user's name, date of birth, address, email address, telephone number, driver's license number, license plate number, etc. The user may also register vehicle specifics such as license plate state, make and model of the vehicle, vehicle color, vehicle year, other defining characteristics, etc. In some embodiments, utilization of the parking system is possible as soon as the user registers their account.

In some embodiments, the user provides the system with a pre-authorization for at least one of the user's vehicles that allows the system to charge the user for any transactionable events involving the user's registered vehicles 312. One benefit of the present invention is that the user's onetime setup of that user's registered user account allows for automated payments. Therefore, users do not have to spend time on their mobile devices or with a parking interface apparatus (such as a parking meter or kiosk) to pay for their vehicle's occupancy of the monitored parking space. This saves users time and, in many cases, money because the users do not have to estimate and add time to the system in accordance with their parking needs.

In some embodiments, the user creates a digital wallet that may serve as a payment method that holds a balance to be used for payment of any applicable transactionable events 314. The user's one or more digital wallets may work as a deposit account(s) or similar to a gift card account(s) as used by companies like Starbucks® or Amazon® where funds are stored and available for use within the system and only the system. In some embodiments, deposited funds are removable back to the user's original payment method. Additionally, in some embodiments, the digital wallet may store international currencies and operate on an exchange rate to local currency before charging the user. Additionally, the user may use digital currencies such as bitcoin, ether, and the like.

In alternative embodiments, the user may register a pre-registered payment method such as a credit card, a debit card, a bank account, or a balance and/or promotional credit already on the user's account in replace of, or addition to, the user's digital wallet. All payment methods that may be used with the method and system of the present invention that allow for digital payments for the relevant services are considered a "pre-registered payment method." In ideal embodiments, the system attempts to deduct any fees associated with the user's account or user's parking from the user's digital wallet prior to attempting other forms of payment.

In some embodiments, the system charges the user for at least one transactionable event that occurs accounting to the system's configurable policies and rates 316. The user may be charged nearly instantly after the user's vehicle leaves the monitored parking space, after a set number of minutes or hours, at the end of the day, week, month, etc., whatever the system's operator desires. The system operator may also decide to charge based on the number of transactionable events. Or, the system operator may charge based on some formula or parameters involving the amount of time after a transactionable event or a number of transactionable events.

In some embodiments, the user may further pre-authorize and be charged for additional balance funds when the user's balance falls below a specified threshold 318. In the event that the user does not have enough funds in their digital wallet, the system may refill the wallet from the user's pre-set payment method such as a credit card transaction or bank account withdrawal.

In some embodiments, the user receives the invoice from the system for all transactionable events that were charged in the preceding set timeframe 320. The frequency of invoices may, in some embodiments, may be changeable according to the user's registered user account settings with the system. Alternatively, the frequency of invoices may be determined by the service provider and/or system operator after criteria is met such as a set number of transactionable events occurred, the total parking time reached a threshold, the total fee due for parking reached a threshold, etc.

Figure 4:
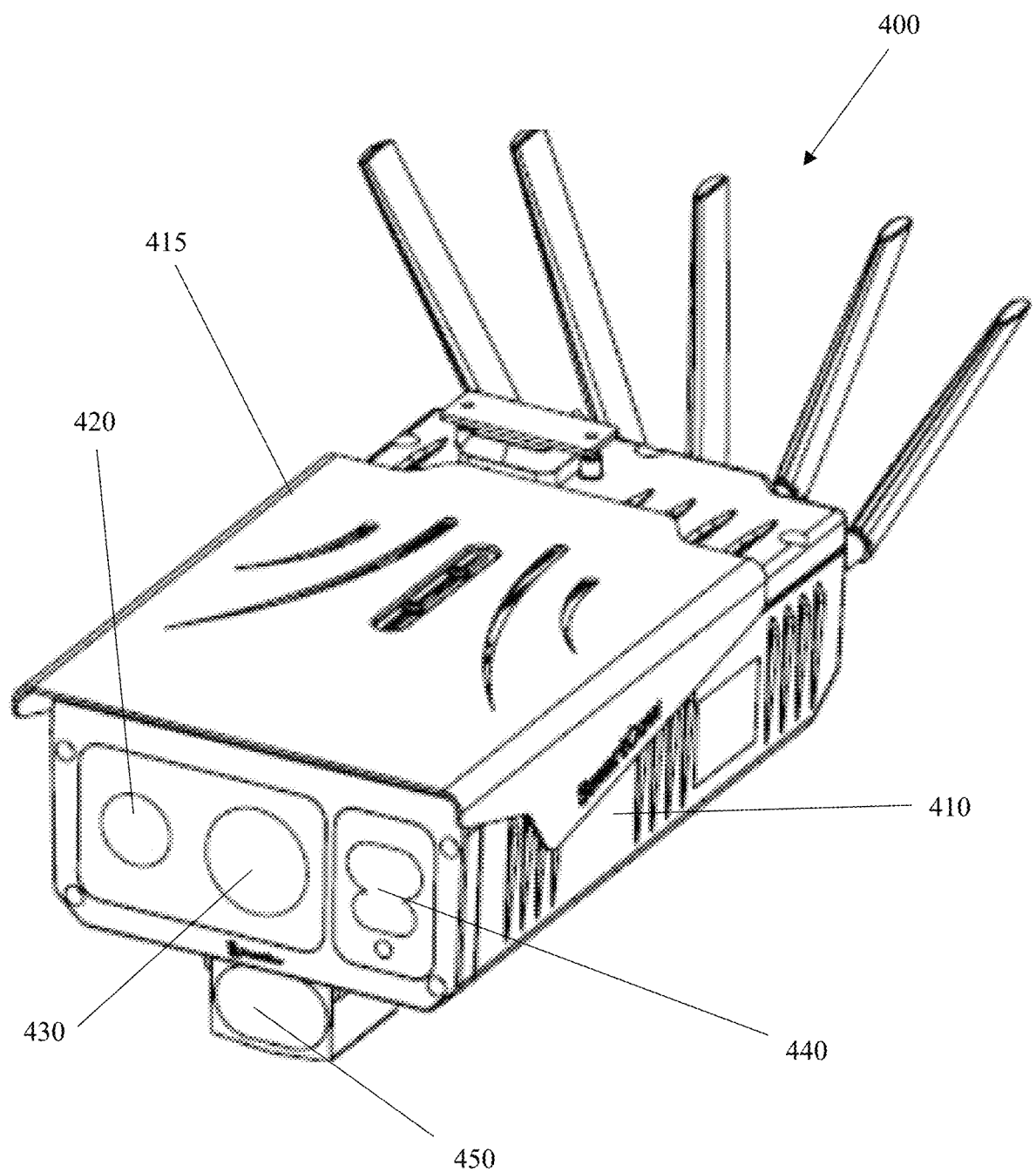
FIG. 4 is an exemplary parking and traffic monitoring device of a computer vision system used to monitor at least one parking space.

FIG. 4 is an exemplary parking and traffic monitoring device of a computer vision system used to monitor at least one parking space. In some embodiments, a parking and traffic monitoring device 400 includes a housing 410, which may further include a top plate 415, a first feed sensor 420, a second feed sensor 430, an IR sensor 440, and an illumination element 450. Interior to the housing 410 are additional components of the computer vision pipeline and/or system used by the parking and traffic monitoring device 400. These components include common computer hardware such as a CPU, GPU, circuitry, memory, storage, output hardware such as ports for communication devices (such as a cable jack, Wi-Fi antennae, 3G/4G/5G antennae (possibly including a SIM card), Bluetooth, etc.), a power unit (battery and/or supplied), heating and/or cooling components, and additional components commonly found in outdoor cameras including processors, and software including a suite of APIs, programs, applications, and routines to execute the computer vision pipeline (including some or all of image acquisition, image preprocessing, feature extraction, object detection and recognition, interpretation or classification, tracking, analysis, post-processing, and output).

Ideally, the housing 410 is constructed in a way to have some level of dust and water protection such as being IP65 or IP67 rated ("IP" meaning ingress protection). Further, the housing may be constructed of metals, plastics, rubbers, silicone, and other suited materials as to prevent damage to the internal components due to additional weather concerns such as heat or cold. Even further, the housing 410 may further contain cooling apparatuses such as heatsinks, radiators, and/or fans and heating apparatuses such as a heating element. These heating and/or cooling apparatuses may affect individual components or the whole unit. For example, a heating unit may be paired with one or both sensors to defog or otherwise warm the sensors to allow the sensors to operate in colder temperatures.

In some embodiments, the first feed sensor 420 and second feed sensor 430 (collectively called dual sensors) feed their data into a single processing unit. This embodiment yields the specific advantage of having one sensor with a narrow, zoomed-in, high resolution field-of-view, and one with a wider angle field of view and processing the image data produced by both of these sensors simultaneously. This dual-sensor mechanism reduces the cost of a dual-camera system by having shared processing hardware (rather than two separate processing hardware units), allows for better quality capture of identifying markings on vehicles using the zoomed-in sensor or similarly allows for the zoomed-in sensor to be configured with a reduced exposure time to improve the system's ability to capture license plates in low-light conditions, and greatly simplifies the process of correlating objects yielded by the object inference program from one sensor to the other, as the correlation can be applied in near-real time rather than retroactively. Further, one sensor may be adapted and/or calibrated to excel at capturing images of moving objects and the other sensor may specialize in capturing still images. For economic (among other) reasons, the sensor for capturing images of moving objects may record images using a global shutter, and the sensor for capturing images of still objects may record images using a rolling shutter. The sensor featuring a rolling shutter may be more suited for recording finer details about a vehicle such as checking for a QR code or other identifying marker, license plate information, any noticeable features of the car such as damage or unique stickers or paint jobs, etc. Some exemplary sensors include CCD sensors, CMOS sensors, DGO sensors, SPAD sensors, and other sensors and constructs to record an image either directly digital or including an analogue-to-digital conversion setup.

In embodiments where the feeds of both sensors direct into a single processing unit, those feeds may be accessed in parallel and the buffers from each feed may be multiplexed together to form a batch. This batch may then be processed to determine inferences of objects on the GPU. Objects derived from at least one inference on one feed may then be correlated with objects derived from at least one inference from the other feed using a perspective transformation on the coordinates of the inferred objects in each feed. This allows use of zoom features of at least one of the sensors to capture close-up images of objects detected by the other sensor, which may be used for observation events (or "events") related to the at least one monitored parking space or other monitored regions.

In some embodiments, the housing 410 may include a transparent plate (such as one made of glass or plastic) over the sensors and or other emitting items such as the illumination element 450. This transparent plate may include weather-resistant materials and coatings (such as anti-fog coatings including hydrophilic coatings and surfactants) to prevent issues with image quality from the sensors.

In some embodiments, the processing unit may run on customized applications, operating systems, and/or firmware to minimize the processing power and time required for the computer vision system to identify vehicles and monitor the at least one parking space. For example, the parking and traffic monitoring device's 400 processor may operate on a Linux-based system running custom drivers suited for working with the CPU and/or GPU. These custom applications include, but are not limited to, programs configured to perform tasks such as monitoring and recording regions of interest in the frame recorded by the sensor that corresponds to desirable targets such as the boundary of one or more parking spaces; event-driven detection and determination of what images should be stored according to sets of criteria (such as detection of a new vehicle, identification of said vehicle, the ingress and/or egress of the vehicle into or from the monitored parking space, etc.), determine whether images should be stored, uploaded to a cloud server or system, or deleted from local memory; compare vehicles to stored model files which aid in detection, classification, and identification of vehicles, and more.

In some embodiments, the parking and traffic monitoring device 400 may send data (sometimes in the form of "events" and called "event messages") to and/or correspond with a server (either owned by the operator of the system or a third party) either at a specified location or part of the cloud. Events may be determined by the appearance of an object, the object's entrance or exit from a specified region (such as a parking space), occlusion of the object, detection of the object, identification of the object, classification of the object, identification of a feature of characteristic of the object, tracking of the object, other tracked occurrences within the frame of the images, and so forth.

Some events that may require correspondence with the server via a message broker system include: an attribute (sometimes called a feature or characteristic) capture event is determined wherein a vehicle has entered a pre-configured region of the frame of at least one sensor's image wherein a license plate may be recorded and relevant data extracted from that image; an entry event wherein a vehicle or other entity (such as a pedestrian) enters into a particular region of the frame; an exit event wherein a vehicle or other entity leaves a particular region of the frame; a "park start" event wherein a vehicle is noted as coming into and remaining at a full stop for a minimum prescribed amount of time (such as 30 seconds, 1 minute, 3 minutes, 5 minutes, etc.) in a region of the frame designated as a monitored parking space, spot, or region; a "park end" event wherein a vehicle which had previously generated a park start event exits the region of the frame designated as a monitored parking space, spot, or region; a "double park start" event wherein a vehicle came to and remained at a full stop for a minimum prescribed amount of time in a region of the frame designated as a traffic lane, bike lane, crosswalk, or other location within a public right of way where said vehicle is not authorized to reside for the minimum prescribed amount of time; and a "double park end" event wherein said vehicle egresses from the region of the frame wherein their double park start event began or otherwise resumes motion in a manner consistent with the intended usage of the area where the vehicle is present. A message broker system is software that enables applications, systems, and services to communicate with each other and exchange information. Often the message broker acts as a way station or hub to pass the messages between applications. The message broker does this by translating messages between formal messaging protocols. Messages generated during the processing of a single frame may be immediately delivered to the server via the message broker system. Events may be transmitted to a server via numerous mechanisms such as: through an HTTP API, file transfers via FTP/SFTP, Azure Service Bus, Amazon SQS, and other common techniques available in the art serving the purpose of fast and efficient transfer of event data and files between the parking and traffic monitoring device 400 and at least one server. The message broker system may further sort messages to send them to appropriate application based on at least one factor such as a tag, applied category, or based on criteria such as the presence of certain identifiers.

The parking and traffic monitoring device 400 may be mounted at an elevation sufficient to view the at least one monitored parking space without excess interference from buildings, structures, foliage, trees, and vehicles. Therefore, the parking and traffic monitoring device 400 should include a mounting mechanism which may include solutions such as a bracket, straps, a threaded receiver, and other suited means to securely fasten the parking and traffic monitoring device 400 to mountable feature such as a building, structure, streetlight, streetlamp, stoplight, or pole. Of course, the mounting mechanism should be designed to work with any potential mountable features (either for individual mountable features or universally with different mountable features).

Figure 5:
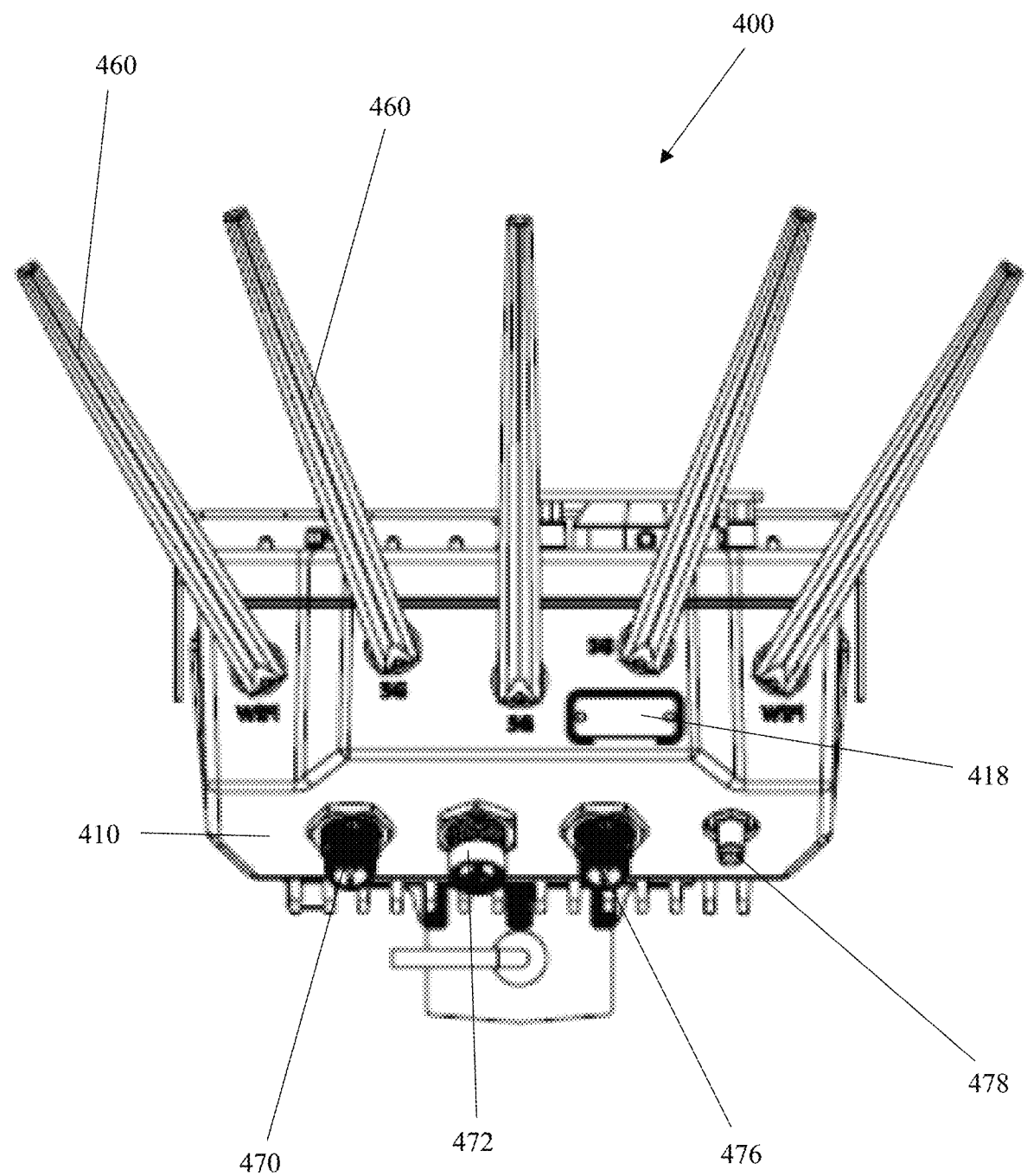
FIG. 5 is another angle of the exemplary parking and traffic monitoring device of FIG. 4.

FIG. 5 is another angle of the exemplary parking and traffic monitoring device of FIG. 4. This embodiment depicts the rear of the parking and traffic monitoring device 400 having a plurality of antennae 460, at least one access panel 418 on the housing 410, and a plurality of connection receivers 470, 472, 476, and 478. In alternative embodiments, the parking and traffic monitoring device 400 may only have one external antenna 460 or the antennae may be internal or a different network connection mechanism, such as a fiber optic or ethernet cable may be coupled with one of the connection receivers such as one adapted to receive M8 and/or M12 ethernet connectors which are particularly useful for their waterproof construction. At least one of the connection receivers should be used to connect the parking and traffic monitoring device 400 to a power source.

Figure 6:
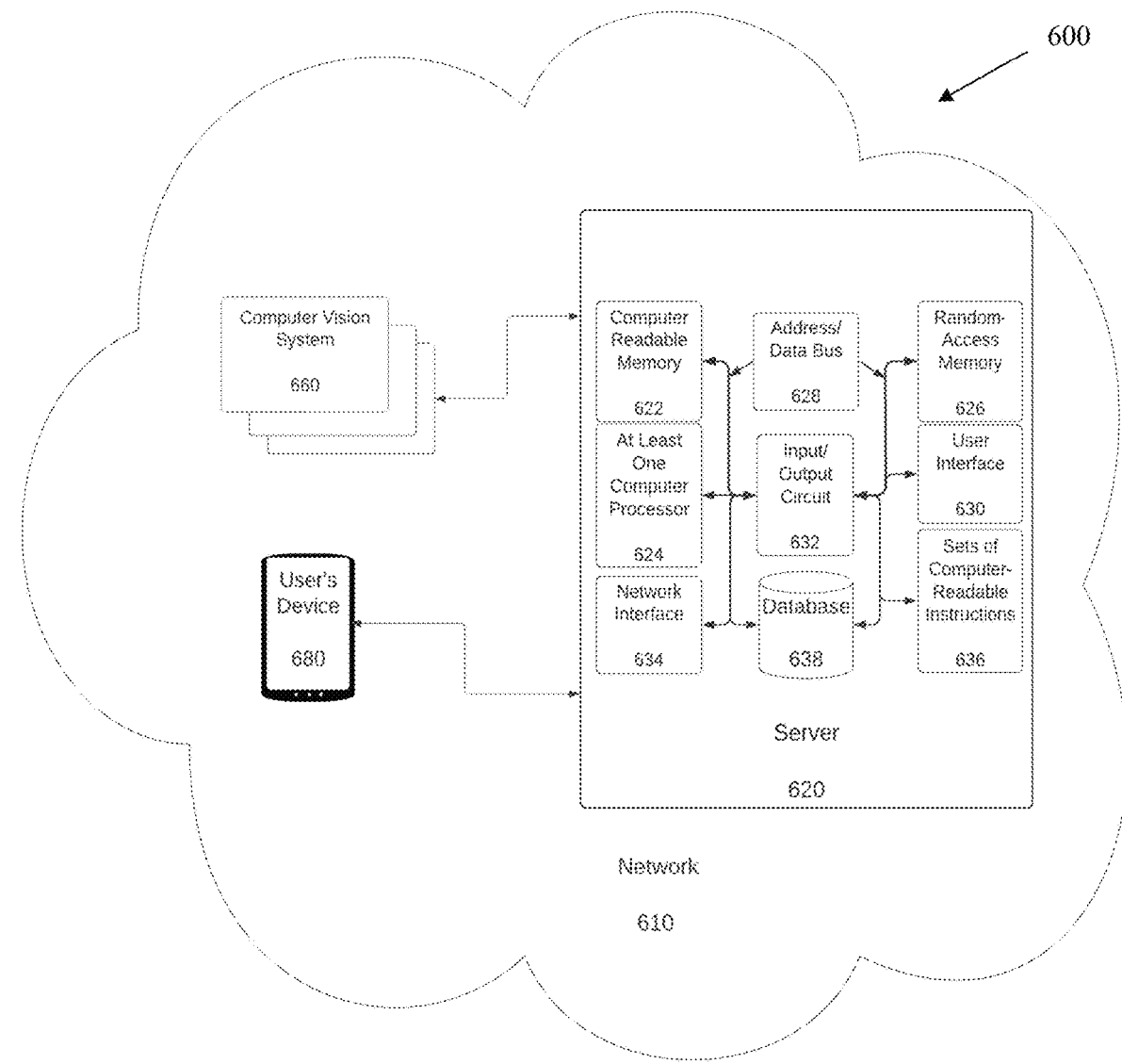
FIG. 6 shows a diagram of an exemplary configuration of the system of one embodiment of the present invention.

FIG. 6 shows a diagram of an exemplary configuration of the system of one embodiment of the present invention. A system for computer vision assisted parking space monitoring and charging (or merely "system") 600 includes a user's device 680, a computer vision system 660, both connected to a server 620 via a network 610.

Some examples of the user's device 680 include a cellular phone, a tablet, a computer, or any other device that a system application may be installed on or that can access a website for the system 600. The system application or website uses the resources of the user's device, displays information to the user, and facilitates interactions with the user through the graphical user interface and the input/output mechanisms of the user's device. Input/output mechanism includes a touch screen, physical keyboard, voice recognition and typing, and other methods known in the art. The application or website communicates with the server 620 via a network 610. The server 620 may be understood to comprise a singular server or multiple servers which may perform the same or different operations for the present invention.

In some embodiments, the computer vision system 660 may include some or all of the same components of the server 620 in addition to the components necessary for the computer vision process. The computer vision system 660 may also include necessary hardware components such as camera(s), housings, lighting components, optical components, computer processing units, graphical processing units, frame grabbing mechanisms (hardware and/or software), or other specialized hardware that works in conjunction with the camera(s) for gathering and processing image data. The frame grabbing hardware, or simply "frame grabber," may be analogue or digital device and includes software components directed to image capture, retention and/or improvement of image quality, and transmission of the frame grabbed image to the computer vision system 660. Improvements of image quality include sharpening, coloring adjustment, and, in some embodiments, machine learning driven enhancements to aid in identification of vehicles and/or parking space monitoring.

If necessary for the operation of the system 600, lighting may be provided by components that are part of the computer vision system 660 such as lighting devices like an LED bulb, it may from devices outside the system 600 (for example: street lamps), or it may be natural light.

The computer vision system 660 includes a communication unit which allows the computer vision system to communicate over the network. The communication unit includes its own network interface which may be adapted to communicate via internet, LANs, infrared networks, mobile networks, satellite networks, LoRaWAN®, mesh networks, and other networks suited to transferring the data used in the system 600. Data sent from the computer vision system 660 to the server 620 includes at least one of the following: vehicle identification data, duration of the at least one vehicle's ingress, presence, and egress from the monitored parking space, determination of transactionable event, image data, video recording data, system diagnostic data to notify the server 620 of any status updates or issues with the computer vision system 660, or any other data that promotes the purpose and/or operation of the method and system 600.

In some embodiments, the camera or other capture device may be separate from most of the other components of the computer vision system 660. Regardless of length of separation between any capture device and the computer vision system 660, the capture device is capable of adequately relaying data to the computer vision system 660 for the purposes of the present invention. In further embodiments, the capture device includes at least one computer processor, computer readable memory, a network interface, and at least one set of instructions to facilitate the capture device's function within the computer vision system 660. The capture device's at least one set of instructions may include vehicle sensing software, vehicle identification software which identifies at least one parameter of vehicle identification, timing software, image reformatting software, tracking software for tracking the at least one vehicle's presence in the at least one image, instructions for storing the at least one image captured by the at least one capture device, and more.

In some embodiments, the tracking software may include highly complex and optimized, or machine learning derived, routines that specialize in tracking and/or anticipating an obscured vehicle's location within the image frame. In some embodiments, the tracking software may rely, or partially rely, on distance based tracking in relation to the obstruction and the at least one vehicle. For example, if a car is occluded farther in the image frame, the search area for re-identification is smaller as the vehicle appears smaller. And, if the same vehicle got occluded closer to the camera, due to its size being bigger, the search area is larger.

In the exemplary embodiments, supervised learning methods are used for detection of objects, object features, object characteristics, and object relationships captured in a set of input images. Supervised learning methods include a process of training detectors or models using a set of training or test data in an offline training phase. By extracting predefined features and manually-annotated labels of each object (e.g., vehicle) in the input images, we can train a first machine learning detector and classifier on many static training images. Additionally, we can train a second machine learning detector and classifier on many static training images grouped by the labels applied when training the first detector. After the training phase, the trained machines learning detectors can be used in a second phase, an operational phase, to receive real-time images and effectively and efficiently perform primary and secondary inferences on the objects in said images. The results of applying said inferences may be used to describe the objects in said images (for example, differentiating between a pedestrian and a car), and may additionally be used as identifying vehicle characteristics which can be used to determine a vehicle's occlusion status in the received images.

In some embodiments, this tracking software may calculate the beginning timestamp and/or the ending timestamp for the vehicle's ingress, occupancy, and egress from the monitored parking space if any of those events or durations were obscured. For example, if a monitored parking space was obscured when a vehicle entered the monitored parking space, the computer vision system 660 may identify the already parked vehicle, including at least one parameter of vehicle identification, and assign the beginning timestamp based on the first image displaying the vehicle within the monitored parking space. Alternatively, the tracking software may calculate the beginning timestamp based on identifying the vehicle entering the image frame, being obscured, and then being detected within the monitored parking space. In one scenario for an embodiment of the tracking software, a delivery truck obstructs the view of the monitored parking space, a vehicle enters the image frame and is assigned at least one parameter of vehicle identification, the vehicle is obstructed by the delivery truck, the computer monitoring system 660 does not see the vehicle drive past the delivery vehicle or otherwise reappear in the image frame, the delivery truck moves and no longer obstructs the monitored parking space revealing the vehicle, and the tracking software re-verifies the vehicle's identifying parameter and calculates the beginning timestamp for a few seconds or minutes after the vehicle was obstructed by the delivery vehicle. Likewise, a similar scenario can be imagined wherein the computer vision system's 660 tracking software sees a vehicle leave the image frame after being obstructed while being in the monitored parking space, allowing the tracking software to calculate the ending timestamp.

The server 620 includes computer readable memory (often referred to as "program memory" or "memory") 622, at least one computer processor (sometimes referred to as a controller, a microcontroller, or a microprocessor 624, a random-access memory ("RAM") 626, an address/data bus 628, a user interface 630, an input/output ("I/O") circuit 632, a network interface 634, at least one set of computer-readable instructions 636, and at least one database 638. All of the components of the server 620 are interconnected via the address/data bus 628. The memory 622 may comprise one or more tangible, non-transitory computer-readable storage media or devices, and may be configured to store computer-readable instructions that, when executed by the at least one computer processor 624, cause the server 620 to implement processes necessary for the operation of the system 600.

The memory 622 may store multiple sets of computer-readable instructions 636 and organize them into modules that can be executed to implement the system 600. In one embodiment, the memory 622 stores multiple sets of computer-readable instructions 636 that cause the server 620 to send and receive data to and from the system application or website on the user's device 680. The memory 622 may store fewer or additional sets of computer-readable instructions on the server 636 in accordance with the necessities of the system 600. Computer-readable instructions 636 include executable features that cause the computer to generate, receive, send, verify, compute, or otherwise perform some computation to aid in furthering the purpose of the present invention. In some embodiments, the computer-readable instructions 636 may be stored as processes, scripts, applications, and/or modules. In some embodiments, the computer-readable instructions 636 may be stored as routines, subroutines, or other blocks of instructions. In some embodiments, these routines, subroutines, or other blocks of instructions include a Policy API that provides parking rules, rates, timetables, and other related services to the system, an invoice generating routine or API to create invoices for transactionable events, a transaction creation routine or API to compute the amounts due for transactionable events, assign said transactionable events to a user account, and perfom payments through a payment gateway; a violation notification routine or service to determine when policy violations have occurred and subsequently notify enforcement officials and/or generate a citation via a third party citation API; an event ingestion routine or API to receive, process, and store event information generated by the CVS; one or more payment gateways to execute charges against payment methods such as credit cards or bank accounts; an image indexing routine or API to store metadata regarding images to associate said images with events generated by the CVS; a User API or routine that allows users to perform interactions with the system such as creating an account, paying an invoice, or view account history. Further, these routines or APIs may be provided to the system and/or the server by third party services or programs.

In some embodiments, the system 600 includes at least one external database that communicates with the server 620 to provide information related to the operation of the system 600, vehicle data, user data, traffic data, driver data, and/or parking data. Further, any external database may be owned by third parties such as a government body like the department of motor vehicles of any state which may provide driver and vehicle data or a private body like an insurance company's database which may also have driver and vehicle data.

The server 620 may be operatively connected to send and receive communications, data, requests, and/or responses over the network 610 via the I/O circuit 632 and network interface 634. The server 620 may connect to the network 610 at the network interface 634 via a wired or wireless connection, or other suitable communications technology. The network 610 may be one or more private or public networks. The network 610 may be a proprietary network, a secure public internet, a virtual private network, a cellular/mobile network, or some other type of network, such as dedicated access lines, plain ordinary telephone lines, satellite links, combinations thereof, etc. Where the network 610 comprises the Internet, data communications may take place over the network 610 via an internet communication protocol. Data is exchanged between the user's device 680, the computer vision system 660, and the server 620 via the network 350.

The server 620 may receive the user's information from the system application or accessed website on one or more of the user's devices 680 via the network 610. The server 620 may also request data or information from system application or accessed website on one or more of the user's devices 660 via the network 610.

In some embodiments, at least one database 638 may be configured to store data related to and/or generated by the system 600. Any database (in the server 620, in the computer vision system 660, or from elsewhere) may be used to store various data and information, including information about the user (including PII), information received from the user, information about the user's vehicle, web traffic metrics, user driving metrics and details, geographic data from the user's device 680, and/or any other data or information that is measurable and/or recordable through the use of the system 600. In ideal embodiments, the server 620 includes at least one database of registered user accounts.

In some embodiments, the server 620 may connect to external systems (either private or publicly owned) to access vehicle and driver data in order to invoice an unregistered user. For example, if the unregistered user parks in one of the monitored parking spaces of the system for two hours and then leaves, the system 600 may first have a built-in grace period that waits for the unregistered user to register and account or process a one-time payment via a website or kiosk. After the grace period, the system 600 may then communicate with a third-party resource such as the state department of motor vehicles for corresponding to the state of a license plate on the unregistered user's vehicle. The information from the DMV may include an address for the unregistered user for the system 600 to cause a paper invoice to be mailed to the unregistered user. In further embodiments, this paper invoice also includes instructions for accessing the application and registering an account with the system 600 for the user's future convenience. If the user ignores the invoice, the system 600 may further relay the nonpayment to authorities and/or it may flag the unregistered user's vehicle for action after a configurable number of nonpayment events occur. Alternatively, payments due for vehicles that are not associated with a registered user account may have their information supplied to third parties who may seek payment for the invoice. These third parties could be contracted private or government entities. Unregistered users should be timely notified of any outstanding invoice, usually within 5 to 10 days after the invoice is generated.

In some embodiments, the system 600 includes at least one user-facing application installed on the user's device 680 and configured to allow the user to interact with the system via a graphical user interface which provides the user with the ability for the user to register an account, edit account details, add at least one payment method, register at least one vehicle to the registered user account, and provide at least one pre-authorization for the at least one payment method which covers charges related to the at least one vehicle's parking fees, fines, and charges and/or refilling of the user's digital wallet.

In alternative embodiments, the system 600 includes at least one user-facing website configured to allow the user to interact with the system via a graphical user interface which provides the user with the ability for the user to register an account, edit account details, add at least one payment method, register at least one vehicle to the registered user account, and provide at least one pre-authorization for the at least one payment method which covers charges related to the at least one vehicle's parking fees, fines, and charges and/or refilling of the user's digital wallet.

Although the components of the system 600 and/or the server 620 are shown in single blocks in the diagram, it should be understood that the memory 622, RAM 626, I/O circuit 632, and other components may be made up of multiple, a set, or a series of those components. For example, there may be several RAM 626 components (sometimes called "RAM sticks") installed within the server 620.

In some embodiments, the server 620 may include a payment gateway for the user to pay the invoice. In alternative embodiments, the server 620 may direct the user to a third-party (such as Stripe, Adyen, or PayPal) external payment gateway to process the payment of the invoice.

It should be understood that any of the examples described herein may include various other features in addition to or in lieu of those described above. By way of example only, any of the examples described herein may also include one or more of the various features disclosed in any of the various references that are incorporated by reference herein.

Figure 7:
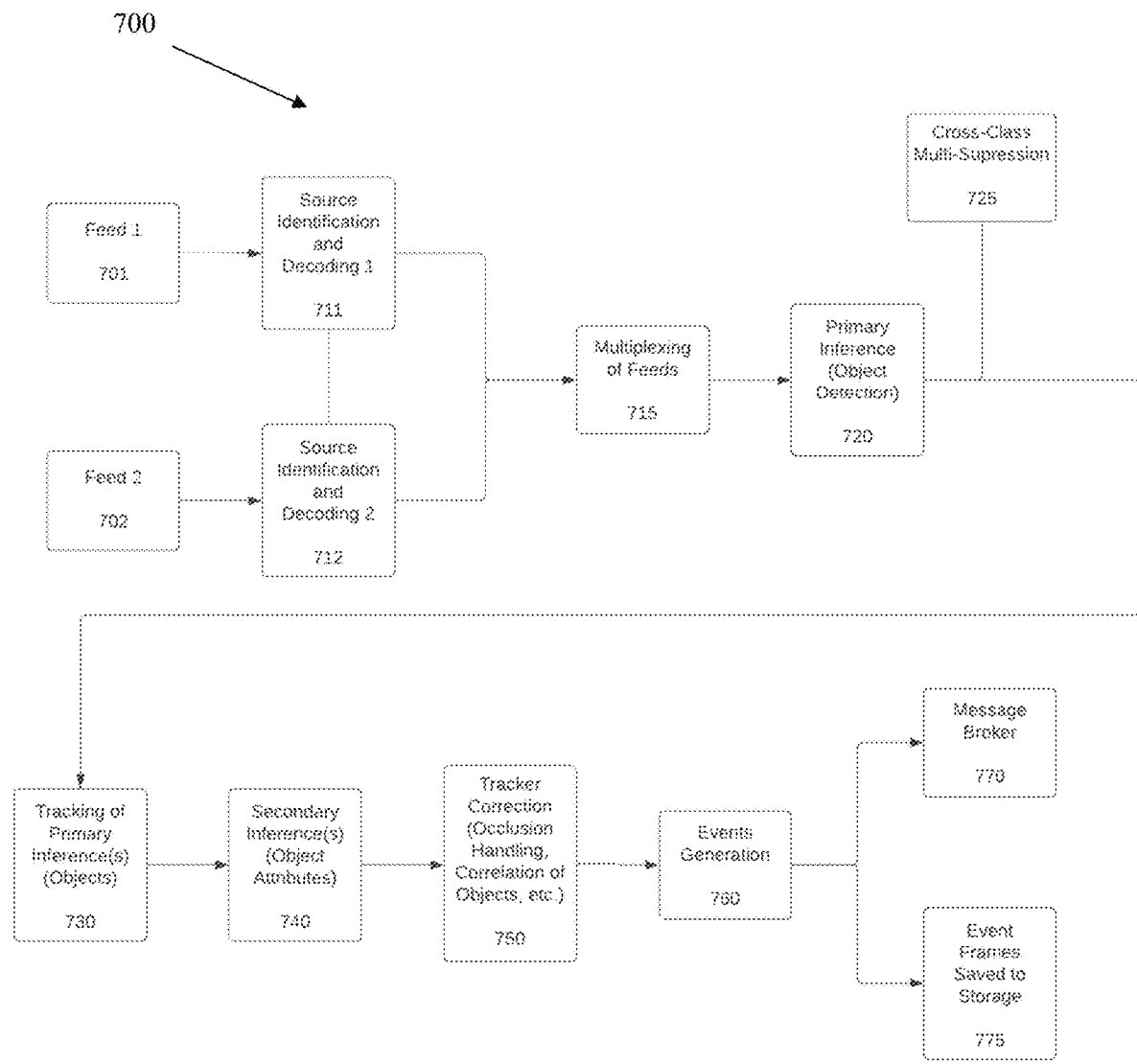
FIG. 7 provides an exemplary method of a pipeline for detection, identification, and tracking of vehicles using a computer vision system.

FIG. 7 provides an exemplary method of a pipeline for detection, identification, and tracking of vehicles using a computer vision system. In some embodiments, an exemplary computer vision system utilizes a method for detection, identification, and tracking at least one vehicle 700 using a computer vision pipeline includes receiving data (such as images or frames) from a first sensor feed 701 and a second sensor feed 702 to a processer pipelining the feeds to a first application 711 and a second application 712 to identify the source and decode said respective images. Alternatively, the first feed 701 and second feed 702 may be sent to the same application running two threads, pathways, pipelines, or other divided routine or process within the same application but handling both feeds independently. Further, whether running in separate or the same applications, the application(s) receiving the feeds may communicate either between the pipelines or with one another. One exemplary pipeline is an NVIDIA GStreamer pipeline that may be used to multiplex (either time division multiplexing or frequency division multiplexing depending on a method operator's desire or need) the multiple feeds 715. This includes multiplexing image buffers from various feeds or streams by appropriately identifying the type of media (such as RTSP, V4L2, MP4, MVK, MOV, etc.), decoding the image buffers, and batching the feeds before inferencing objects from said feeds. This multiplexing may be accomplished by plugins for GStreamer such as NVIDIA's Gst-NvStreamerMux plugin. Other multiplex programs may be used, but those specialized for video or image feeds prove particularly adept for the present invention.

At some point in the method for detection, identification, and tracking at least one vehicle 700 a demultiplexing program may be used to separate the multiplex feeds, videos, images, or data.

Once the feeds (which may be more than two but only two are listed for the purposes of this example) are multiplexed, the image, video, feed, or data is sent to another application, plugin, or system (or collectively, object inference program) to perform a primary inference process 720 to detect and identify objects within the image, video, feed, or data. Identifiable objects include four-wheeled vehicles, two-wheeled vehicles, pedestrians, multi-wheeled vehicles (more than four, ex: a semi-trailer truck), or other objects related to monitoring parking and traffic. Exemplary programs that may be used for this object inference, identification, and tracking include NVIDIA's Gst-NvInfer plugin, Viso Suite plugins, YOLOv3, PyTorch and other suitable alternatives. Detections occur with every frame but subsequent identifications and classifications may occur only once and follow the object by being operably held in preserved memory for the duration that the object is within the field-of-view.

A duplicate detection elimination program may be included to eliminate or suppress cross-class multiple or duplicate detections 725 in order to eliminate the possibility of producing multiple events for the same object (vehicle). Ideally, this routine is applied immediately to the outputs of the primary inference program in order to ensure that downstream plugins, applications, or programs receive unique detection metadata for each object in the field-of-view and/or the frame of an image or video, or other data/feed. This duplicate detection elimination program may be achieved by common techniques such as image hashing (example programs include phash and FiftyOne), and may alternatively be implemented by analyzing the output of the primary inference program and suppressing low confidence detections which overlap significantly with higher confidence detections with similar characteristics.

Further, tracking programs (specifically MOT programs) are used to track the objects frame by frame (or buffer by buffer, etc.) 730. Exemplary tracking programs, plugins, and services include NVIDIA Gst-NvTracker plugin, SORT, TrackFlow, MotionTrack, GHOST, etc. Ideally, software that improves on standard discriminative correlation filter-based tracking software is used to ensure tracking of vehicles that undergo long-term occlusions before reappearing in the frame, buffer, field of view, etc. In most embodiments, tracking of the object begins when it enters the field-of-view and ceases once there is no detection of the object for a configurable duration of time (such as ten minutes, one hour, etc.) whether by exiting field-of-view or occlusion. Additional specialized software may be used to predict occlusion/egress that bases the analysis on the last detected location of the object, the region in which the object was last detected, and the proximity of surrounding detections used to determine whether the first object has been occluded by at least one other object. When an object becomes occluded, a feature vector representing the features/attributes/characteristics (collectively "features") of the occluded object extracted by the primary detection model and classification models is retained. This feature vector is used in conjunction with the object characteristics mentioned above (region, proximity to other objects) to compute a similarity score which is then used to determine when and if the object reappears. The similarity score quantifies the difference between a first set of multi-modal features and a second set of multi-modal features using a first output and a second output from the images generated by the sensors. Egress may be determined by the software as it checks individual image or video frames and determines that a previously identified object within one of the monitored parking spaces or regions has moved out of said spaces or regions, whether frame-by-frame or deduced by occlusion analysis and prediction.

An exemplary computer vision pipeline may include a system for object detection and identification, feature/attribute/characteristic extraction which may provide a pixel-level object label and bounding box for each feature or object identified in an image. In many cases, the features or objects identified in the image data will correspond to objects classified as vehicles. As such, these objects in the input image can be extracted and represented with labels and bounding boxes. The bounding boxes can be represented as a rectangular box of a size corresponding to the extracted vehicle object. Additionally, object-level contour or segmentation detections for each object can also be performed using known techniques. As a result, the occlusion detection system can obtain or produce, for each image, vehicle object detections represented with labels and bounding boxes and object-level contour detections for each vehicle object in the image.

The same or another application, plugin, or system may perform a secondary inference process 740 to detect characteristics of the objects and classify them. For example, the secondary inference process 740 may detect modality of a vehicle (such as car, van, bus, HGV, bike, etc.), the license plate region on said vehicle, the classification of the color of the vehicle, the make and model of the vehicle, and other identifiable traits of the object(s). The exemplary programs listed for the primary inference process 720 apply to the secondary inference process 730.

Tracker correction 750 is often necessary to improve system accuracy and confidence which benefits end users by correctly tracking their parking session and billing accordingly. Regardless of the program, plugin, or service used to track the object(s) in the frames, additional oversight and aid may be provided by additional software such as a tracker correction program. The tracker correction program records a history of each object's position(s) and classification predictions for a set number of buffers/frames/images (such as 10 buffers) and further performs the following tasks: (1) assigning a unique identifier (such as a descriptive character string including a series of alphanumeric characters with a high likelihood of being globally unique) to each object within the frame of one sensor; (2) applying perspective transformations on the coordinates of each object's bounding box from the frame of another sensor thereby assigning the same unique identifier to the object in both sensors' frames (achieving dual identification of the object); (3) identifying the object with the highest intersection over union ("IoU") value with the transformed version of the object in the frame of the second sensor compared to the identified and determined same object in the frame of the first sensor; (4) wherein identification occurs when (a) an object enters a frame of one of the sensors, (b) the object exits the frame of one of the sensors, (c) the object is occluded by another object within the frame of one of the sensors, and (d) the object reappears from occlusion by another object within the frame of one of the sensors and the tracker correction program associates the correct unique identifier with the object once again; and (5) ensuring that occluded object metadata is available for downstream plugins, applications, and systems to process the events. Occluded objects may have a timeout that timestamps either the last or a predicted time that the occluded object left a monitored parking space. For instance, the timeout may roll back to the last frame in which the occluded object was not occluded, or it may use prediction software that uses context clues from the occluding object and the surroundings to predict when the occluded object left the monitored parking space. This prediction may be generated through a model-based inter-prediction process that takes place over multiple images or frames.

In some embodiments, the computer vision pipeline may assign the IoU for each of a plurality of object detections of the one or more objects with respect to each of a plurality of tracked objects. The IoU for each of the plurality of object detections of the one or more objects can be positively correlated with an association score (e.g., a greater intersection over union is correlated with a greater association score). For example, the computer vision pipeline can compare the location and area occupied by an object detection to the location and area occupied by an object track at a time interval a tenth of a second in the past. An object detection that has a greater IoU with a tracked object can have a greater probability of being associated, and a greater association score, than an object detection that has a very low IoU (e.g., an intersection over union of zero) with respect to an object track.

In some embodiments, classification predictions may follow an "eager learning" approach that employs classifiers based on past learning to derive classification predictions from multimodal feature/characteristic/attribute information. Each modality contains separate information useful to classification or identification. An eager learning embodiment includes multiple levels of classifiers. A first level of classifiers performs classification predictions based upon feature information provided in individual modalities. A second level of classifiers performs classification predictions based upon classification predictions produced by the first level of classifiers. The goal is to use classifiers trained to extract useful classification or identification predictors from the information in each of the modalities and to combine or fuse that information into an overall classification or identification predictor.

The classifier may include a function module that has been trained to determine output classification prediction information based upon a prescribed set of input information. A plurality of first level of classifiers $f_1 \ldots f_D$ produce respective classification predictions based upon information input from their respective associated modalities $M_1 \ldots M_D$. For instance, classifier $f_1$ produces a classification prediction based upon components of $M_1$. A second level classifier f produces a classification prediction based upon the multiple of classification predictions of $f_1 \ldots f_D$. The classifiers may be implemented as computer program code modules encoded in computer readable medium.

After the tracker correction program records and potentially corrects the metadata for objects (for example, if the objects were occluded to become "occluded object"), another application, plugin, or system, such as an events generation program, may analyze at least one object's history and the region of interest that the object or objects belong to 760 in order to detect events such as object frame entry, object identification, attribute capture for the object, object frame exit, park start, park end, double park start, double park end, object occlusion start, object occlusion end, etc. The region of interest could be any area within an image's frame but particularly often refers to the monitored parking space(s). The metadata for these events may be attached to the buffer by this events generation program, or otherwise transmitted to downstream processing elements.

Next, bifurcated steps may occur in tandem or relatively the same time. Alternatively, the bifurcated steps may occur at different times due to network, hardware, or other issues, or due to operator instructions. First, event messages are published to the server (cloud or otherwise) via the message broker 770. Second, event images, frames, or buffers are saved to storage 775 (locally and/or on a server). Information collection (images, events, and messages) should occur in as close to real-time as is practical with modern processing and networking capabilities. That is to say, information collection should be reasonably instant, and the sending and receiving of messages and images occur practically within fractions of a second to a few seconds at most. This includes occlusion calculating, vehicle information/metadata validation checks, event generation, and so on. If, for any reason such as a network outage, there is an unexpected delay in any computation and/or network transmission, information may be temporarily stored in memory or in local persistent storage so long as memory or storage is available, keeping a portion of said memory or persistent storage for possibly needed device operations.

Most or all of the pipeline described in FIG. 7 is performed via edge processing. That is to say, the majority of analysis, computation, determination, correction, prediction, etc. is performed on the parking and traffic monitoring device and not on a separate system or server. This keeps system resource requirements localized to the individual devices and reduces network traffic. This is beneficial because any issues, problems, complications, or failures is isolated to the parking spaces or regions monitored by the device, whereas if the devices transmitted data and images to a centralized server, issues with that server could affect a much greater number of monitored parking spaces or regions.

In alternative embodiments, edge computing or processing may, in some scenarios, offer or host a cloud-like distributed service, to offer orchestration and management for applications and coordinated service instances among many types of storage and compute resources. Edge computing is also expected to be closely integrated with existing use cases and technology developed for Internet of Things and Fog/distributed networking configurations, as endpoint devices, clients, and gateways attempt to access network resources and applications at locations closer to the edge of the network.

The preceding pipeline may gather additional data and metadata related to more than merely details about the objects (vehicles, pedestrians, bikes, etc.) that is usable by other components of the greater system to provide said data to interested parties (such as individual users, city planning partners, traffic analysts, commercial drivers and organizations, etc.). This data may also be processed at the edge (that is to say, on the local device) before processed or unprocessed data is sent to a centralized cloud data store. Again, by employing edge processing devices, the present invention cuts down on network traffic and resources while being able to maintain a local log of any data if the network was down or otherwise unavailable for a period of time. Further, by edge processing all the data prior to sending images, event messages, etc. to a centralized data store or processor, there is less of a need for expensive and/or large centralized servers or computers for data ingestion and processing. This focus on local devices specialized for edge processing using a computer vision pipeline is innovative to the need for autonomous parking fee charging and automated payment. Previously, hardware, software, and network limitations made the present innovation difficult to produce and too cost prohibitive to be developed to its current point, much less adopted by municipalities.

Figure 8:
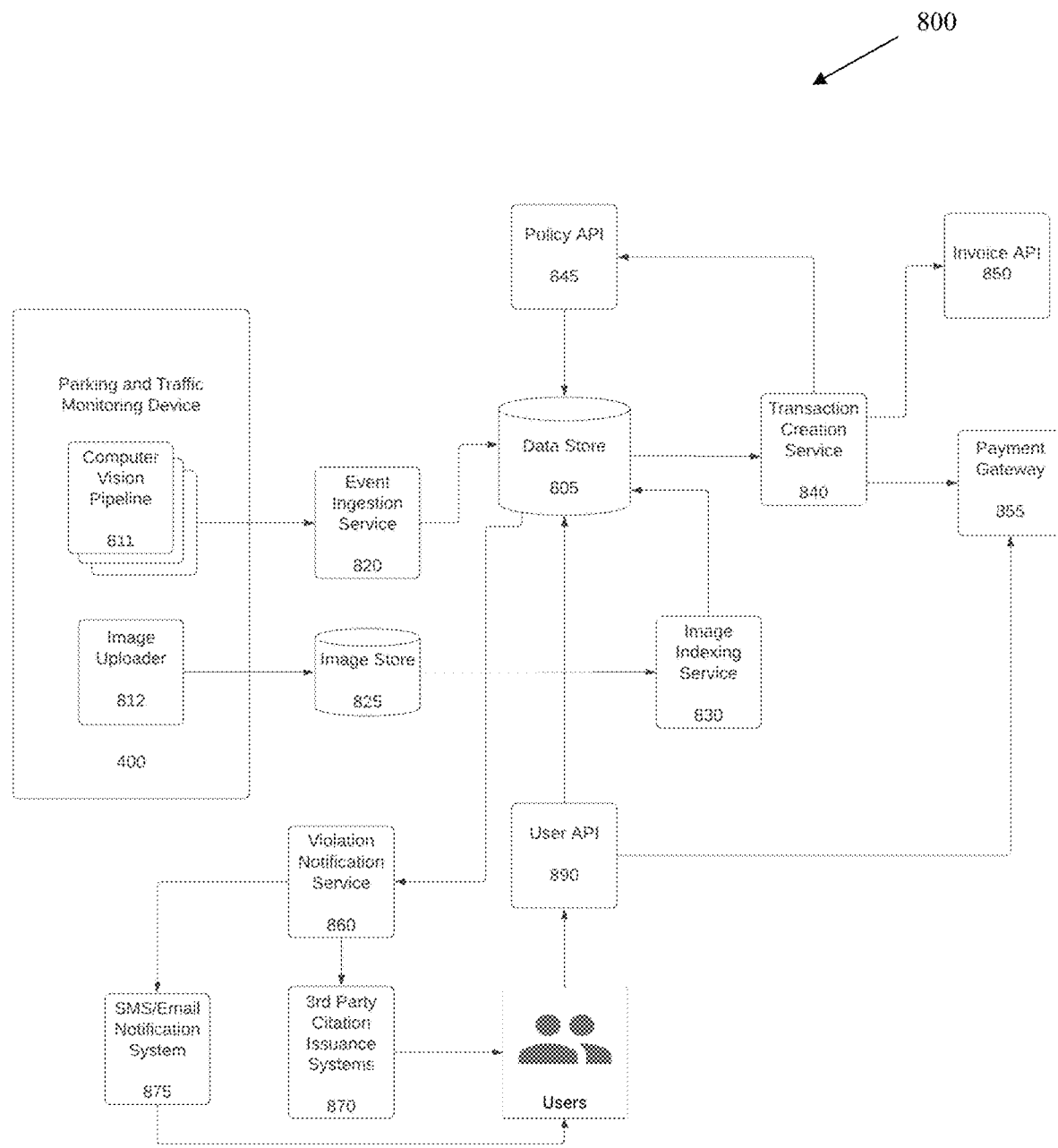
FIG. 8 displays another exemplary embodiment of the present invention in the form of a system for automated fee charging and automated payment for parking with additional functions.

FIG. 8 displays another exemplary embodiment of the present invention in the form of a system for automated fee charging and automated payment for parking with additional functions. In some embodiments, the previously described parking and traffic monitoring device 400, having a computer vision pipeline 811 for identifying and tracking vehicles entering and exiting monitored parking spaces or regions (aka "events") and an image uploader 812 for storing images of events to another server or storage device is placed at an advantageous viewpoint to monitor a number of parking spaces (at least one space and typically no more than ten spaces). This parking and traffic monitoring device 400 monitors its designated parking spaces in solitude, meaning it is not part of a network on monitoring or capturing devices creating multi-angular views of said parking spaces. The computer vision pipeline 811 sends its output (i.e. images, video, frames, buffers, metadata, classified events, diagnostics, and/or other useful types of transmittable data) to an event ingestion service 820 which usually includes an application and/or software to receive said output over a network and cause this output to be stored within a data store 805. The event ingestion service 820 may include software to analyze, encrypt, demultiplex, enhance, and evaluate the incoming output. Alternatively, some of these processes may happen on the parking and traffic monitoring device 400. The event ingestion service 820 may handle analysis of the incoming output may include useful processes such as image quality evaluations using programs such as Imatest, Ranger IQA, IQstest, and so on. Image quality may be evaluated based on a number of criteria including sharpness, noise, color accuracy, dynamic range, artifacting or fragmented images, fidelity, WDR, and TVL. The image uploader 812 of the parking and traffic monitoring device 400 sends images or video files to an image store 825. This does not include other metadata or data about events as this is sent to the event ingestion service 820 from the computer vision pipeline 811. It is useful, in some embodiments, to have a separate storage for the images; hence the presence of the image uploader 812 and image store 825.

The image store 825 may use software such as a frame saving program or other software which is operably instructed to save event images based on user-configured events, thresholds, and visualizations to the user-specified image store 825.

The image store 825 may use an image indexing service 830 which categorizes, classifies, compresses, and/or otherwise sorts the images, frames, buffers, video, etc. related to at least one vehicles ingress and egress from at least one monitored parking spot, space, area, or region. The items received by the image indexing service 830 may be sorted based on at least one sort criteria such as the unique identifier(s) related to an object (such as a make, model, license plate number, a generated object ID, etc. associated with one user's vehicle). One example for why sets of images are useful in the event that a user disputes their fee for their parking session. The sorted images are sent to the larger data store which may pair said images with the event data from the event ingestion service 820. Markers, identifiers, or other classifying data/metadata/tags may be present on both the event outputs and the images to easily relate one to the other.

A transaction creation service 840 may be used to assess fees for events based on a policy API 845 and create automated transactions for payment of the fees associated to the transactionable event (or "associated fee") that are owed by the user. The transaction creation service 840 may use software to calculate the fee for a particular vehicle as previously described wherein the duration of a parking session is calculated as well as any changes to the rate for the duration, additional fees, and other charges associated with the user's parking session within the monitored parking spot, space, or region.

The transaction creation service 840 may assess a fee and automatically charge for the fee by deducting the fee amount from the user's wallet balance. If the wallet balance is insufficient and automatic payment from the user's registered payment method is invalid or does not process, an invoice for the fee(s) related to the transactionable event or events may be generated and sent via an invoice API 850 to the user associated with the vehicle (possibly because the user's payment method expired, declined, or was otherwise insufficient). In case of any insufficiency, the user may be given an allotted timeframe (such as five business days) to correct said sufficiency before an invoice is generated and presented to the user (either online or through physical mail). Further law of sufficiency correction may result in additional steps being taken such as freezing, closing, or otherwise hindering the user's account and/or sending the owed amount to a collections service. The invoice may be received or shown within the user's account either via an application on the user's device or online via a user API 890. If an invoice is generated for an unregistered user or for a defunct registered user, third parties may be contacted to ascertain either type of user's mailing address so that the invoice may be physically delivered.

The user API 890 may further provide access to a payment gateway 855 to allow the user to pay for invoices, recharge (add funds) their holding balance of funds for automatic payments or pay for additional services. This payment gateway 855 may lead to a third party payment processor for completion of payment for any of the foregoing.

A violation notification service 860 may run a routine, algorithm, process, or use an API on the data store 805 to analyze events and/or transactionable events within the datastore 805 to assess whether a violation has occurred by the user (for example: if a vehicle stayed within a monitored parking spot longer than an allotted amount of time, if the vehicle was taking up two monitoring parking spots, or if the vehicle is not allowed to use the monitored parking spot). Then, the violation notification service 860 may contact the user who has provided contact information (whether externally allowed or by having a registered user account) via an SMS/Email notification system 875. Alternatively, whether or not the user has contact information on file or available, the violation notification service 860 may notify an enforcement official or third-party vendor via third-party citation issuance system(s) 870. This system may be connected with local law/traffic enforcement, city-designated officials, and/or towing services to complete the necessary steps to rectify the violation. Further, the violation notification service 860 may perform an independent evaluation to assess whether a violation occurred either before or after contacting the user and third party (ies). Even further, the system may be set up to notify enforcement officials of ongoing violations, past violations, or both.

Received violations may be considered potential violations. Events related to potential violations that have been deemed to be a violation may be categorized as determined violations. Only determined violations should have a citation generated for the determined violation by the violation notification service 860. The violation notification service may 860 contact a third party such as the DMV to get address or mailing information for the vehicle represented by the object that is subject to a violation fee for the determined violation. This address or mailing information may be used to send the physical citation to the DMV-registered owner of the vehicle.

The user API 890 may work with more than one user-facing application which may be tailored to accommodate different types of users. For example, users may be classified into different subsets such as (1) a basic user, (2) a commercial user/driver, (3) an enterprise user, and (4) a municipal/government user. The basic user may be a normal driver who engages with the system for the purpose of parking their vehicle and nothing else. Basic users may install an application or connect with a website or webapp (collectively "application") that allows them to register an account for automated and contactless payment for their parking sessions in monitored parking spots and have very little additional functionality within the application other than setting up automatic payments and/or storing a balance for payments of parking fees.

As another example, a commercial user or driver may engage with the user API 890 through a more feature-rich or comprehensive application which not only provides the software infrastructure for registration and automatic payments of parking fees, but also provides the commercial driver with information regarding traffic patterns, warnings and explanation of potential delays, parking availability, and other functionalities benefitting commercial drivers. Further, basic users and/or commercial drivers may be offered a way to reserve a parking space using their respective applications through the user API 890. The parking and traffic monitoring device or another apparatus may be used to indicate that the parking space is reserved. Further, mechanical instruments, such as barricades, may be deployed to prevent other vehicles from parking in the reserved parking space. Even further, the user may instruct or an application on the user's smart phone or vehicle may notify the mechanical instrument to disengage as the user nears the reserved parking space.

The present invention is particularly useful for commercial drivers because automatically paying for parking using their registered user account eliminates the time spent interfacing with traditional parking payment applications and hardware (such as parking meters). The time saved is an appreciable amount of efficiency for commercial drivers and companies. Further, the application may keep a record of previous parking sessions, including cost, time spent parked, and start and stop times, which is useful for both accounting purposes and resolving timing issues between the commercial driver/company and the recipient party of the delivery. Commercial users/drivers may register their user account with the system either individually or as part of a collective for the company/fleet/union/etc. Signup may begin by visiting the website, application, webapp, scanning a QR code available near the monitored parking space, or through other common avenues of connection.

In another example, the user API 890 may work with an application designed to be used by commercial vehicle companies (still considered "commercial users') having more than one vehicle to allow those companies to plan shipping and transportation logistics based on traffic and parking data collected and made available by the system. These sets of data include number of vehicles, vehicle's direction, vehicle's time in frame (or time elapsed during vehicle's presence in "entry" region and "exit region"), traffic delays or rate of travel (which may be measured by the difference between the normal rate than an object (vehicle) moves through the street and/or parking spaces and the rate of said movement within a settable duration (also considering other factors such as "rush hours," holidays, city events, protests, etc.)), road conditions, lane/parking space availability, vehicle times through intersections, duration and location of parking sessions, and so on. This version of the application may further include data, insights, and tools to allow municipal/governmental third parties and workers to make appropriate plans and infrastructure changes to traffic and parking spaces, spots, regions, and structures. The application may provide these parties with real-time and historic parking and tracking data regarding parking occupancy, violations, revenue generated by the system, and related metrics (occupancy time per vehicle, percent occupied spaces, percent available spaces, space occupancy ratio based on time used, space occupancy ratio based on the type of vehicle, enterprise/commercial loading times, and other data related to the parking space, traffic, and vehicles). This data be delivered as a collective at a set time after each day for review of more accurate and comprehensive data. Data in this case may include the messages and images, video, etc. Further, data is unlikely to be desired by end users as raw data, so transformative processes or analysis may be performed prior to the presentation of the data to those interested parties. Generally, the transformative process for the data could be as simple as providing a user interface (possibly accessed via the user API) to the third parties to interact with to present the data when queried in a data structure or table such as an SQL database, GraphQL API, or REST API. Additional transformations may be applied to aggregate data in the interest of facilitating historical reporting.

Data regarding the payment, wallet refill frequency and occurrence, refill amount, vehicle data, user data, real-time parking space occupancy numbers, frequency and duration of parking sessions and transactionable events, fees assessed for transactionable events, invoice frequency, invoice payment status, violation type, violation notice sent, violation fee paid, violation payment status, violation fee sent to collections, etc. may be shared with municipal/government users as required by law or otherwise agreed to by the system owner/operator and the municipality who's parking spaces are being monitored by the system. This data may further include the image, frame, or video data stored in the system. Municipal users may fetch this data through means such as a convenient web application using a client-side HTTP API. The data may be stored within the data store.

In some embodiments, the user API may need to be accessed through an application or webapp that is customized to a certain geographic region, such as a city. This includes the user account being created for and assigned within a database linked to that geographic region. For example, a partnered municipality may have certain requirements in order for the system owner to create a suitable user-facing webapp for that municipalities parking needs. These requirements may differ between municipalities. Such difference could include things like the amount of PII needed from the user, the vehicle's details, and payment information. In other embodiments, the user account may be registered to a central platform or shared between geographic regions.

In some instances, when dealing with commercial, enterprise, municipal, or government users, the system owner may create specialized accounts for those users. Accounts created in this way will usually have the user immediately change their password once account details are given to said user. Alternatively, such users can be directed to a unique account creation process using some other mechanism such as a unique URL.

In some embodiments, the applications may include client data sorting tools as well as exporting said data to a readable file type (such as csv).

If a reservation feature is present within the user application or webapp, there may be a tiered system where, for example, municipal users may adjust the reservations of commercial and private users (drivers) or the municipal user(s) may have highest priority for reservation or be able to reserve parking space(s) further in advance than other users. Further, commercial users (or any particular user) may have the ability to set re-occurring reservations as to accommodate things like commercial deliveries which may be made daily, weekly, monthly, etc. on a set schedule and/or at a set window of time.

In some embodiments, the application through the user API 890 may include a "dispute" pathway for users to dispute the entire fee or part of a fee for parking in a monitored parking space. This may include webchat, email, or telephonic correspondence wherein the user lodges their complaint to be reviewed. Further, automated processes may be put in place to allow for the user dispute to be handled by a program through a set of instructions that may deny or approve the user's request. These decisions may be appealable for human review. Further, the instructions may include criteria such as: (1) number of user requests/disputes, (2) user account age, (3) amount of revenue generated to the system by the user within a settable duration (entire account age, past 5 years, past year, past month, etc.), (4) weather concerns, (5) promotions available, (6) other considerations that may be reviewed and automatically allowed by keyword (such as "blocked," "police," "protests," etc.), and so on.

In some embodiments, all transactionable events may be tolled for a set duration, such as one day, one week, one month, etc. before an invoice is calculated and sent to the user and/or automatically charged to the user's account, balance, and/or payment method. The user will be notified through established channels (notification, SMS, email, etc.) if there is insufficient funds in any of the accounts, balances, and payment method, or if said payment method declines.

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various versions of the present invention, further adaptations of the methods, systems, and apparatus described herein may be accomplished by appropriate modifications by one of ordinary skill in the art without departing from the scope of the present invention. Several such potential modifications have been mentioned, and others will be apparent to those skilled in the art. For instance, the examples, versions, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for automated parking space monitoring, automated fee charging, and automated payment for parking comprising:
   a single parking and traffic monitoring device mounted to monitor at least one parking space and having:
   a housing;
   at least two feed sensors;
   at least one IR sensor;
   at least one illumination element;
   a power unit;
   one or more processors comprising a single processing unit;
   a computer vision pipeline;
   wherein the computer vision pipeline includes the feed sensors operably coupled to the single processing unit;

wherein a first feed sensor is configured to capture a first image having a field-of-view that is sufficient to cover multiple parking spaces along a street and the first image is at least used to detect at least one object, and a second feed sensor is configured to capture a second image having a narrower field-of-view with higher-resolution that is suitable for detecting and identifying the at least one object present in the first image and the second image;

wherein the single processing unit uses an image processing pipeline to multiplex the first image from the first feed sensor and the second image from the second feed sensor;

wherein the multiplexed images are analyzed by an object inference program to detect and identify all identifiable objects within each image;

wherein the identified objects are tracked through a plurality of images by a multiple object tracking program;

wherein the computer vision pipeline, via edge processing, generates at least one event message for each multiplexed set of images containing the at least one object detected, identified, and tracked as a vehicle that caused at least one observed event related to any of the vehicle's: (1) entrance into any feed sensor's field-of-view, (2) entrance into one of the monitored parking spaces, (3) exit from one of the monitored parking spaces, and (4) exit from any feed sensor's field-of-view;

wherein images are temporarily stored on local memory for each image that contains the vehicle that caused the at least one observed event to occur and generate the at least one event message for that observed event;

wherein the single parking and traffic monitoring device causes a unique identifier to be generated and assigned linking the at least one event message to each image from each feed sensor containing the vehicle;

wherein each vehicle in each image having a unique identifier is tracked throughout each image using the multiple object tracking program;

wherein all of the foregoing operations are accomplished via edge processing on the single parking and traffic monitoring device;

a communication unit capable of communicating via a network;

an image uploader operably connected to the communication unit;

wherein the computer vision pipeline is operably connected to an event ingestion service via the network to receive the at least one event message;

wherein the image uploader is operably connected to an image store via the network to receive the at least one image per feed sensor; and wherein the single parking and traffic monitoring device sends the event message to the event ingestion service and the at least one image per feed sensor to the image store;

an image indexing service on the network which receives the at least one image from the image store and sorts the at least one image, having the unique identifier, based on at least one sort criteria for the vehicle within the at least one image that caused the observed event;

a data store on the network which receives the at least one event message via the event ingestion service and the at least one image per feed sensor via the image store, matches the at least one event message and the at least one image per feed sensor via matching the unique identifier assigned to the vehicle in each image and each event message, and stores the matching images and event messages;

a transaction creation service on the network that assesses whether a transactionable event occurred based more than one event messages, which are linked by the unique identifier assigned to the vehicle that caused the event messages to be generated, using a policy API to determine a fee for a user based on the event messages;

an application including a user API that allows the user to operably connect to the system via the network;

wherein a driver who is the user may, prior to the at least one observed event, register an account including information related to the driver and provide to the system (1) information related to at least one payment method, (2) features of the driver's vehicle, and (3) pre-authorization for payment for at least one fee associated with the driver parking the driver's vehicle in the parking space monitored by the single parking and traffic monitoring device generating at least one transactionable event, wherein the driver's vehicle is the object associated with unique identifier subject to the fee for the transactionable event; and wherein the system automatically charges the user's payment method for the user's transactionable event without further interaction by the user due to the information provided in the registered user account, active payment method, and pre-authorization for payment for the user's parking subject to fees assessed under the policy API and charged to the user by the system.

2. The system of claim 1, further comprising a payment gateway operably coupled to the user API which processes the pre-authorized payment of the fee and, upon a payment failure, provides the user with a notification and prompts the user for an alternative method for paying the fee.

3. The system of claim 1, further comprising a violation notification service on the network and operably connected to an SMS/Email notification system for alerting enforcement officials of a violation related to the user's parking session, and operably connected to a third-party citation issuance system.

4. The system of claim 1, wherein the single parking and traffic monitoring device collects parking and traffic data, using the images and event messages generated by the computer vision pipeline, related to parking and traffic events and stores that data in the data store.

5. The system of claim 4, wherein parking and traffic data is available for retrieval and review from the data store via the user API by a commercial user whose account has been given access to the parking and traffic data.

6. The system of claim 4, wherein parking and traffic data is available for retrieval and review from the data store via the user API by an account owned by a municipal third party whose account has been given access to the parking and traffic data.

7. The system of claim 1, wherein the event messages include at least one of:
object frame entry,
object identification,
attribute capture for the object,
object frame exit,
park start,
park end, double park start,
double park end,
object occlusion start, and
object occlusion end.

8. The system of claim 7, wherein the single parking and traffic monitoring device, via the computer vision pipeline:
uses an object inference program to perform a primary inference to detect the at least one object in at least one image of each set of multiplexed images;
uses a duplicate detection elimination program using image hashing to suppress and eliminate duplicate detections of objects and events based on at least one intersection over union score in each set of multiplexed images;
uses the object inference program to perform a secondary inference to detect and classify characteristics of the at least one object to classify objects that are detected and identified as vehicles in at least one image of each set of multiplexed images;
uses a tracker correction program to record a history of the at least one object's position within a temporal sequence of images per feed sensor and at least one classification prediction for the at least one object within the temporal sequence of images per feed sensor;
wherein the tracker correction program assigns the unique identifier to each detected and identified object within each image from the first feed sensor and the second feed sensor, assigns a bounding box to each identified object, applies perspective transformations on the coordinates of each object's bounding box from the image of the second feed sensor while assigning the same unique identifier to the corresponding identified object in each feed sensors' images to achieve dual and identical identification of each object in corresponding images from the first feed sensor and the second feed sensor, identifies the object within each image with the highest intersection over union value with the transformed version of the object in the frame of the first feed sensor compared to the identified and determined same object in the frame of the second feed sensor, wherein identification occurs at least when (a) the object enters a frame of one of the feed sensors, (b) the object exits the frame of one of the feed sensors, (c) the object is occluded by a different object within the frame of one of the feed sensors, and (d) the object reappears from occlusion by the different object within the frame of one of the feed sensors and the tracker correction program associates the correct unique identifier with the un-occluded object once again, and ensures that occluded object metadata is available for downstream plugins, applications, and systems to process the events; and
generates the observed event to become one of the event messages based on the history and classification prediction of the object that was occluded.

9. The system of claim 8, wherein the single parking and traffic monitoring device:
determines whether object occlusion exists within the set of multiplexed images by determining whether there is occlusion of the at least one object classified as a vehicle and that is the subject of the observed event based (1) on the last detected location of that at least one object within the frame of at least one of the sensors' images, (2) the region in which the at least one object was last detected, and (3) the proximity of surrounding detections of other objects used to determine whether the at least one object has been occluded by another object;
retains a feature vector representing at least one feature of the occluded object;
computes a similarity score to determine whether a newly appearing object within the frame of the image is the occluded object when the occluded object reappears within the frame of the image;
determines a predicted time of exit for the occluded object based on the reappearance of the formerly occluded object; and
sends a corresponding event message related to the formerly occluded object's predicted exit from the parking space monitored by the single parking and traffic monitoring device.

10. The system of claim 1, wherein the housing structure of the single parking and traffic monitoring device includes an internal heating unit.

11. The system of claim 1, further comprising an invoice API operably connected with the data store which generates an invoice for an unregistered user and causes that invoice to be sent to the unregistered user by obtaining at least one of the unregistered user's phone number, email address, and mailing address from a third party having the unregistered user's contact information, and sends an invoice generated for a registered user when that user's payment method is insufficient and the insufficiency is not corrected within an allotted timeframe.

12. A method for automated parking space monitoring, automated fee charging, and automated payment for parking comprising:
a user registering a user account with a system for automated fee charging and automated payment for parking, through a user API, wherein the user provides the user's personally identifiable information, information about the user's vehicle, at least one payment method, and the user provides a consent to a pre-authorization to be automatically charged a fee for the presence of the user's vehicle in a monitored parking space;
using a single parking and traffic monitoring device, designed for edge processing, to monitor at least one parking space on a street, wherein the single parking and traffic monitoring device uses a computer vision pipeline to:
simultaneously record images from each of two feed sensors, the two feed sensors being operably coupled, via a multiplexing program, into a single processing unit to produce multiplexed images of at least one object to be detected and identified as a vehicle and the vehicle being the subject of at least one observed event;
use an object inference program to perform a primary inference by detecting and identifying the at least one object in at least one of the multiplexed images and classifying the at least one object as a vehicle based on at least one feature of the vehicle;
use a duplicate detection elimination program using image hashing to perform a cross-class multi-suppression to eliminate and suppress duplicate object detections within the multiplexed images;
use a multiple object tracking program to track the vehicle that was detected and identified by the object inference program through a plurality of the multiplexed images;

perform a secondary inference, using the object inference program, to confirm correct classification of objects that are detected, identified, and classified as vehicles based on the at least one feature of each vehicle in at least one image of each set of multiplexed images;

use a tracker correction program to record a history of the at least one object's position within a temporal sequence of images per feed sensor and using at least one classification prediction for the at least one object within the temporal sequence of images per feed sensor;

wherein the tracker correction program assigns a unique identifier to each detected and identified object within each image from a first feed sensor and a second feed sensor, assigns a bounding box to each identified object, applies perspective transformations on the coordinates of each object's bounding box from the image of the second feed sensor while assigning the same unique identifier to the corresponding identified object in each feed sensors' images to achieve dual and identical identification of each object in corresponding images from the first feed sensor and the second feed sensor, identifies the object within each image with the highest intersection over union value with the transformed version of the object in a frame of the first feed sensor compared to the identified and determined same object in a frame of the second feed sensor, wherein identification occurs at least when (a) the object enters a frame of one of the feed sensors, (b) the object exits the frame of one of the feed sensors, (c) the object is occluded by a different object within the frame of one of the feed sensors, and (d) the object reappears from occlusion by the different object within the frame of one of the feed sensors and the tracker correction program associates the correct unique identifier with the un-occluded object once again, and ensures that occluded object metadata is available for downstream plugins, applications, and systems to process the observed events;

generate at least one event message, via an events generation program, for at least one observed event related to the recorded at least one image from each feed sensor by analyzing the at least one object's history throughout the sequence of images, particularly, that object's history within a region of interest within each image, wherein the region of interest is the monitored parking space;

wherein each event message is related to each image used to generate that event message by assigning the unique identifier to the event message and image of the corresponding vehicle that is the subject of the observed event;

in tandem,
  temporarily publishing the at least one event message to a program for storing event messages on the single parking and traffic monitoring device via a message broker, and
  temporarily saving the at least one image from each sensor to local storage;

sending, via a network, the event messages to an event ingestion service prior to the event messages being sent to a data store on the network and within the system wherein the event ingestion service sorts the event messages based on the unique identifier;

uploading, via the network, the images recorded by the computer vision pipeline to an image store before those images are processed by an image indexing service, which sorts the images based on the unique identifier and at least one sort criteria, prior to the images being sent and stored on the data store;

the data store, linking the stored images with their corresponding event messages based on the matching unique identifiers;

the data store, employing a transaction creation service to assess whether the vehicle's observed events constituted a transactionable event by calculating the duration that the vehicle remained within the monitored parking space beyond a specified amount of time as set in a policy API and assess an amount, also according to the policy API, for a fee for the duration that the user's vehicle spent within the monitored parking space to be automatically charged to the user's account;

the system automatically charging the user the fee corresponding to an amount owed for the transactionable event; and the user automatically paying the charged fee, with no post-account registration interaction from the user, due to the user's provided information in the user's registered account information, including the pre-authorization to be automatically charged, by the system.

13. The method of claim 12, further comprising the single parking and traffic monitoring device recording traffic and parking data related to the objects within the images, observed events, and corresponding event messages before sending that data to the data store.

14. The method of claim 13, wherein the traffic and parking data includes data pertaining to at least one of: the number of vehicles, those vehicles' directions of travel, each vehicle's time in frame, rate of travel, road conditions, parking space availability, vehicles' time within monitored parking spaces, vehicles' times to travel through intersections, and types of vehicles captured within the images.

15. The method of claim 14, further comprising a commercial user account being given access to at least some part of the traffic and parking data and the commercial user account accessing that data via the user API.

16. The method of claim 15, further comprising at least one of the user and the commercial user reserving the parking space through the user API.

17. The method of claim 14, further comprising a municipal user account being given access to at least some part of the traffic and parking data and the municipal user account accessing that data via the user API.

18. The method of claim 12, further comprising:
  the data store employing a violation notification service on the network to assess whether a potential violation has occurred for the at least one object detected and identified as a vehicle in the at least one image;
  the violation notification service, using the policy API, reviewing the potential violation, assessing whether the potential violation is a determined violation, and notifying at least one enforcement official of the determined violation via an SMS/Email notification system; and
  the data store employing the violation notification service to generate a citation with a violation fee related to the determined violation that is mailed to a DMV-registered owner of the vehicle in the at least one image used to generate that observed event which the violation notification service deemed to be the determined violation.

19. The method of claim 12, further comprising:
- the data store employing a violation notification service on the network to assess using the policy API, whether a potential violation has occurred for the vehicle detected and identified in the at least one image;
- the violation notification service reviewing the potential violation, assessing whether the potential violation is a determined violation, and notifying at least one third-party vendor of the determined violation by interfacing with a third-party citation issuance system; and
- the data store employing the violation notification service to generate a citation with a violation fee related to the determined violation that is mailed to a DMV-registered owner of the vehicle in the at least one image used to generate that observed event which the violation notification service deemed to be the determined violation.

20. The system of claim 1, wherein the housing of the single parking and traffic monitoring device is constructed to have at least an Ingress Protection rating of 65.